US012786953B2

(12) United States Patent
Jiang et al.

(10) Patent No.: US 12,786,953 B2
(45) Date of Patent: Nov. 3, 2026

(54) SENSING MEASUREMENT METHOD, SENSING MEASUREMENT INDICATION METHOD, TERMINAL, AND NETWORK SIDE DEVICE

(71) Applicant: VIVO MOBILE COMMUNICATION CO., LTD., Guangdong (CN)

(72) Inventors: Dajie Jiang, Guangdong (CN); Jian Yao, Guangdong (CN); Hao Liu, Guangdong (CN); Pucong Wang, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 272 days.

(21) Appl. No.: 18/659,366

(22) Filed: May 9, 2024

(65) Prior Publication Data

US 2024/0314735 A1 Sep. 19, 2024

Related U.S. Application Data

(63) Continuation of application No. PCT/CN2022/132241, filed on Nov. 16, 2022.

(30) Foreign Application Priority Data

Nov. 19, 2021 (CN) ......................... 202111402636.5

(51) Int. Cl.

*H04W 68/02* (2009.01)
*H04W 72/1273* (2023.01)
*H04W 72/232* (2023.01)

(52) U.S. Cl.

CPC ....... *H04W 68/02* (2013.01); *H04W 72/1273* (2013.01); *H04W 72/232* (2023.01)

(58) Field of Classification Search

None
See application file for complete search history.

(56) References Cited

U.S. PATENT DOCUMENTS

| | | | | |
|---|---|---|---|---|
| 12,022,436 | B2 * | 6/2024 | Deng | H04W 72/02 |
| 2022/0191782 | A1 * | 6/2022 | Ratasuk | H04W 52/0206 |
| 2023/0370820 | A1 * | 11/2023 | Cheng | H04W 4/38 |

FOREIGN PATENT DOCUMENTS

| | | | |
|---|---|---|---|
| CN | 105611567 | A | 5/2016 |
| CN | 112136349 | A | 12/2020 |

(Continued)

OTHER PUBLICATIONS

International Search Report for International Application No. PCT/CN2022/132241 of Jan. 18, 2023.

(Continued)

*Primary Examiner* — Adolf Dsouza
(74) *Attorney, Agent, or Firm* — Perilla Knox & Hildebrandt; Kenneth A. Knox

(57) ABSTRACT

A sensing measurement method indication method, is disclosed, where the method includes: receiving, by a terminal, a PEI, where the PEI includes sensing indication information; and performing, by the terminal, a target operation according to the sensing indication information, where the target operation includes at least one of the following: performing sensing measurement on a first signal, and reporting a sensing measurement quantity; and sending, to a target device, a second signal used by the target device to perform sensing measurement.

18 Claims, 7 Drawing Sheets

(56) References Cited

FOREIGN PATENT DOCUMENTS

| | | | |
|---|---|---|---|
| CN | 112673685 | A | 4/2021 |
| CN | 113163476 | A | 7/2021 |
| CN | 113366798 | A | 9/2021 |
| EP | 4319203 | A1 | 2/2024 |
| WO | 2021175032 | A1 | 9/2021 |
| WO | 2021180206 | A1 | 9/2021 |
| WO | 2021214517 | A1 | 10/2021 |

OTHER PUBLICATIONS

First Office Action for CN Patent Application No. 202111402636.5 of Jul. 31, 2025.

Extended European Search Report for EP Patent Application No. 22894832.9 of Feb. 13, 2025.

3GPP TSG RAN WG1 #107, Discussion on paging enhancements, document R1-2111747, e-Meeting, Nov. 11-19, 2021. [Online]. Available: 3GPP server (Samsung contribution), Agenda Item 8.7.1.1.

3GPP TSG RAN WG1 #106-e, Preliminary RAN1 UE features list for Rel-17 NR, document R1-2108679, e-Meeting, Aug. 16-27, 2021. [Online]. Available: 3GPP server (Moderators: AT&T, NTT Docomo, Inc.), Agenda Item 8.

3GPP TSG RAN WG1 #103-e, Moderator summary for TRS/CSI-RS occasion(s) for idle/inactive UEs, document R1-2008178, e-Meeting, Oct. 26-Nov. 13, 2020. [Online]. Available: 3GPP server (Moderator: Samsung), Agenda Item 8.7.1.2.

* cited by examiner

SENSING MEASUREMENT METHOD, SENSING MEASUREMENT INDICATION METHOD, TERMINAL, AND NETWORK SIDE DEVICE

CROSS-REFERENCE TO RELATED APPLICATIONS

This application is a Bypass continuation application of PCT International Application No. PCT/CN2022/132241 filed on Nov. 16, 2022, which claims priority to Chinese Patent Application No. 202111402636.5, filed in China on Nov. 19, 2021, which are incorporated herein by reference in their entireties.

TECHNICAL FIELD

This application pertains to the field of communication technologies, and specifically relates to a sensing measurement method, a sensing measurement indication method, a terminal, and a network side device.

BACKGROUND

In some communication systems (for example, a 5G system), a paging early indication (PEI) is newly defined, and the PEI indicates paging-related information. For example, the PEI indicates a terminal whether to monitor a paging physical downlink control channel (paging PDCCH) associated with the PEI. The terminal in an idle state or an inactive state determines, according to the indication of the PEI, whether to monitor the paging PDCCH associated with the PEI. However, currently, the PEI can only indicate the paging-related information. As a result, the terminal can only determine, based on the PEI, whether to monitor the paging PDCCH associated with the PEI, thereby resulting in poor sensing performance of the terminal.

SUMMARY

Embodiments of this application provide a sensing measurement method, a sensing measurement indication method, a terminal, and a network side device.

According to a first aspect, a sensing measurement method is provided, including:

- receiving, by a terminal, a PEI, where the PEI includes sensing indication information; and
- performing, by the terminal, a target operation according to the sensing indication information, where the target operation includes at least one of the following:
- performing sensing measurement on a first signal, and reporting a sensing measurement quantity; and
- sending, to a target device, a second signal used by the target device to perform sensing measurement.

According to a second aspect, a sensing measurement indication method is provided, including:

- sending, by a network side device, a PEI to a terminal, where the PEI includes sensing indication information, the sensing indication information is used by the terminal to perform a target operation, and the target operation includes at least one of the following:
- performing sensing measurement on a first signal, and reporting a sensing measurement quantity; and
- sending, to a target device, a second signal used by the target device to perform sensing measurement.

According to a third aspect, a sensing measurement apparatus is provided, including:

- a receiving module, configured to receive a PEI, where the PEI includes sensing indication information; and
- an execution module, configured to perform a target operation according to the sensing indication information, where the target operation includes at least one of the following:
- performing sensing measurement on a first signal, and reporting a sensing measurement quantity; and
- sending, to a target device, a second signal used by the target device to perform sensing measurement.

According to a fourth aspect, a sensing measurement indication apparatus is provided, including:

- a sending module, configured to send a PEI to a terminal, where the PEI includes sensing indication information, the sensing indication information is used by the terminal to perform a target operation, and the target operation includes at least one of the following:
- performing sensing measurement on a first signal, and reporting a sensing measurement quantity; and
- sending, to a target device, a second signal used by the target device to perform sensing measurement.

According to a fifth aspect, a terminal is provided. The terminal includes a processor and a memory, the memory stores a program or an instruction that can be run on the processor, and the program or the instruction is executed by the processor to implement the steps of the method according to the first aspect.

According to a sixth aspect, a terminal is provided, including a processor and a communication interface. The communication interface is configured to: receive a PEI, where the PEI includes sensing indication information; and perform a target operation according to the sensing indication information, where the target operation includes at least one of the following: performing sensing measurement on a first signal, and reporting a sensing measurement quantity; and sending, to a target device, a second signal used by the target device to perform sensing measurement.

According to a seventh aspect, a network side device is provided. The network side device includes a processor and a memory, the memory stores a program or an instruction that can be run on the processor, and the program or the instruction is executed by the processor to implement the steps of the method according to the second aspect.

According to an eighth aspect, a network side device is provided, including a processor and a communication interface. The communication interface is configured to: send a paging early indication PEI to a terminal, where the PEI includes sensing indication information, the sensing indication information is used by the terminal to perform a target operation, and the target operation includes at least one of the following: performing sensing measurement on a first signal, and reporting a sensing measurement quantity; and sending, to a target device, a second signal used by the target device to perform sensing measurement.

According to a ninth aspect, a sensing measurement system is provided, including a terminal and a network side device. The terminal may be configured to perform the steps of the sensing measurement method according to the first aspect, and the network side device may be configured to perform the steps of the sensing measurement indication method according to the second aspect.

According to a tenth aspect, a readable storage medium is provided, where a program or an instruction is stored on the readable storage medium, and the program or the instruction is executed by a processor to implement the steps of the sensing measurement method according to the first aspect, or the steps of the sensing measurement indication method according to the second aspect.

According to an eleventh aspect, a chip is provided. The chip includes a processor and a communication interface, the communication interface is coupled to the processor, and the processor is configured to run a program or an instruction to implement the sensing measurement method according to the first aspect or the sensing measurement indication method according to the second aspect.

According to a twelfth aspect, a computer program/program product is provided. The computer program/program product is stored in a storage medium, and the computer program/program product is executed by at least one processor to implement the sensing measurement method according to the first aspect, or the computer program/program product is executed by at least one processor to implement the sensing measurement indication method according to the second aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill based on the embodiments of this application shall fall within the protection scope of this application.

In the specification and claims of this application, the terms “first”, “second”, and the like are intended to distinguish between similar objects but do not describe a specific order or sequence. It should be understood that the terms used in such a way are interchangeable in proper circumstances so that the embodiments of this application can be implemented in orders other than the order illustrated or described herein. Objects classified by “first” and “second” are usually of a same type, and the number of objects is not limited. For example, there may be one or more first objects. In addition, in the specification and claims, “and/or” represents at least one of connected objects, and a character “/” generally represents an “or” relationship between associated objects.

It should be noted that technologies described in the embodiments of this application are not limited to a Long Time Evolution (LTE)/LTE-advanced (LTE-A) system, and may further be applied to other wireless communication systems such as Code Division Multiple Access (CDMA), Time Division Multiple Access (TDMA), Frequency Division Multiple Access (FDMA), Orthogonal Frequency Division Multiple Access (OFDMA), single-carrier frequency division multiple access (SC-FD-MA), and other systems. The terms “system” and “network” in the embodiments of this application may be used interchangeably. The technologies described can be applied to both the systems and the radio technologies mentioned above as well as to other systems and radio technologies. The following describes a New Radio (NR) system for example purposes, and NR terms are used in most of the following descriptions. These technologies can also be applied to applications other than an NR system application, such as a 6th generation (6G) communication system.

Figure 1:
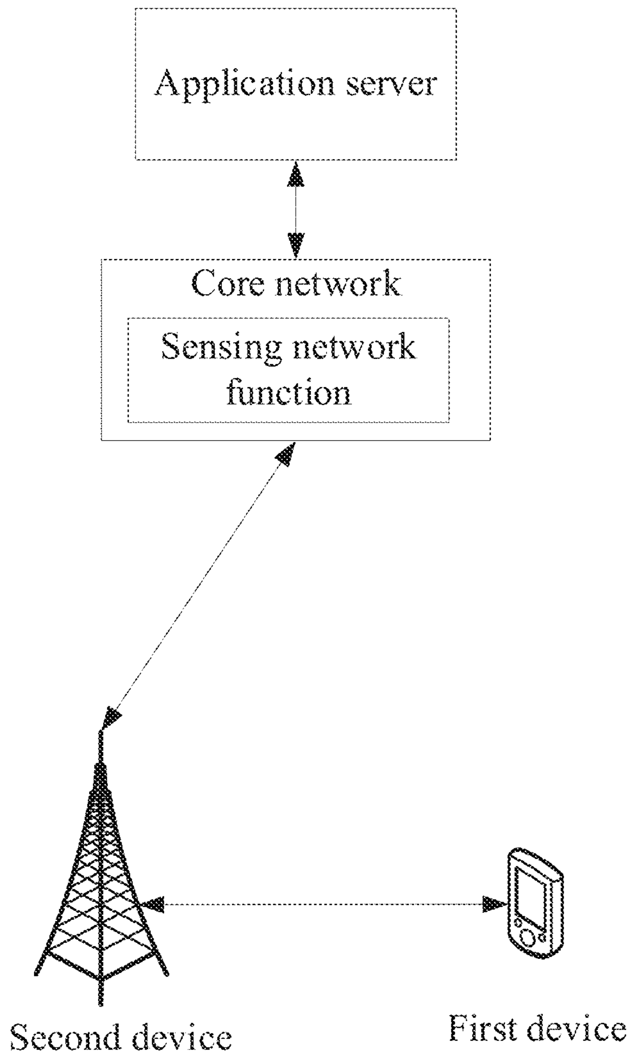
FIG. 1 is a block diagram of a wireless communication system to which the embodiments of this application are applicable.

FIG. 1 is a block diagram of a wireless communication system to which the embodiments of this application can be applied. The wireless communication system includes a first device, a second device, a core network, and an application server. The first device may be a terminal, and the second device may be a terminal or a network side device. In FIG. 1, the second device is a network side device.

In the embodiments of this application, the terminal may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), an augmented reality (AR)/virtual reality (VR) device, a robot, a wearable device, vehicle user equipment (VUE), pedestrian user equipment (PUE), a smart home (a home device with a wireless communication function, such as a refrigerator, a television, a washing machine, or a furniture), a game console, a personal computer (PC), a teller machine, or a self-service machine. The wearable device includes a smart watch, a smart band, a smart headset, smart glasses, smart jewelry (a smart bangle, a smart bracelet, a smart ring, a smart necklace, a smart anklet, and a smart chain), a smart wrist strap, a smart dress, and the like. It should be noted that a specific type of the terminal is not limited in the embodiments of this application.

The network side device may include an access network device or a core network device, and the access network device may also be referred to as a radio access network device, a radio access network (RAN), a radio access network function, or a radio access network unit. The access network device 12 may include a base station, a WLAN access point, a Wi-Fi node, or the like. The base station may be referred to as a NodeB, an evolved NodeB (cNB), an access point, a base transceiver station (BTS), a radio base station, a radio transceiver, a basic service set (BSS), an extended service set (ESS), a home NodeB, a home evolved NodeB, a transmitting receiving point (TRP), or another appropriate term in the field. As long as a same technical effect is achieved, the base station is not limited to a specified technical term. It should be noted that, in this application, only a base station in an NR system is used as an example, and a specific type of the base station is not limited. The core network device may include but is not limited to at least one of the following: a core network node, a core network function, a mobility management entity (MME), an access and mobility management function (AMF), a session management function (SMF), a user plane function (UPF), a policy control function (PCF), a policy and charging rule function unit (PCRF), an edge application server discovery function (EASDF), unified data management (UDM), a unified data repository (UDR), a home subscriber server (HSS), a centralized network configuration (CNC), a network repository function (NRF), a network exposure function (NEF), a local NEF (Local NEF, or L-NEF), a binding support function (BSF), an application function (AF), and the like. It should be noted that, in the embodiments of this application, only a core network device in an NR system is used as an example for description, and a specific type of the core network device is not limited.

In the embodiments of this application, the first device and the second device have a sensing capability. A device having a sensing capability can send and receive a radio signal to sense information such as an orientation, a distance, and a speed of a target object, or perform a sensing operation such as detecting, tracking, identifying, or imaging a target object, event or environment. For example, in some scenarios or implementations, a sensing category may be shown in the following Table 1:

TABLE 1

| Wireless sensing category | Sensing function | Application use |
|---|---|---|
| Large-scale macro-sensing category | Weather, air quality, etc. | Meteorology, agriculture, and life services |
| | Traffic flow (intersections) and human flow (subway entrances) | Smart city, intelligent transportation, and business services |
| | Animal activity, migration, etc. | Animal husbandry, ecological environment protection, etc. |
| | Target tracking, distance measurement, speed measurement, contours, etc. | Many application scenarios for conventional radars |
| | 3D map construction | Intelligent driving, navigation, and smart city |
| Short-distance refined-sensing category | Gesture recognition | Intelligent interaction of smartphones, games, and smart home |
| | Heartbeat/Respiration, etc. | Health and medical care |
| | Imaging, material detection, etc. | Security check, industry, etc. |

It should be noted that the sensing category shown in the foregoing Table 1 is merely an example for description, and a sensing measurement category is not limited in the embodiments of this application.

In addition, in the embodiments of this application, sensing purposes may be classified into two types. The first type of purpose is that sensing is used to aid communication or enhance communication performance. For example, the first device provides a more accurate beamforming alignment device by tracking a moving track of a device. The other purpose is sensing that is not directly related to communication. For example, the first device monitors a weather condition by using a radio signal, for example, a mobile phone recognizes a gesture of a user by using millimeter-wave wireless sensing.

In the embodiments of this application, a sensing manner may include active sensing, passive sensing, and interactive sensing.

Figure 2:
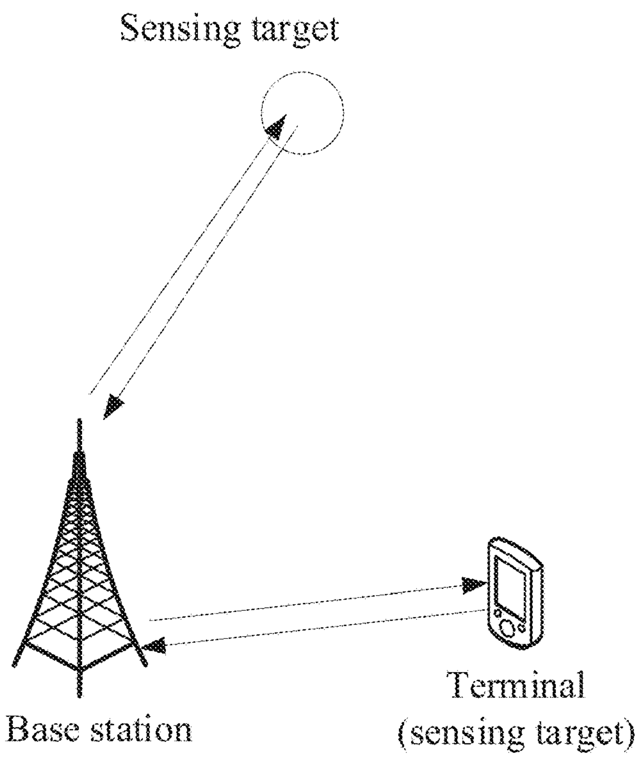
FIG. 2 is a schematic diagram of wireless sensing according to an embodiment of this application.

The active sensing may be that a device performs sensing by using a reflected signal (for example, an echo) of a signal transmitted by the device, and a transceiver is located in a same location. Different antennas may be used to sense ambient information of the device. For example, as shown in FIG. 2, a base station performs sensing by using a reflected signal of a signal transmitted by the base station.

Figure 3:
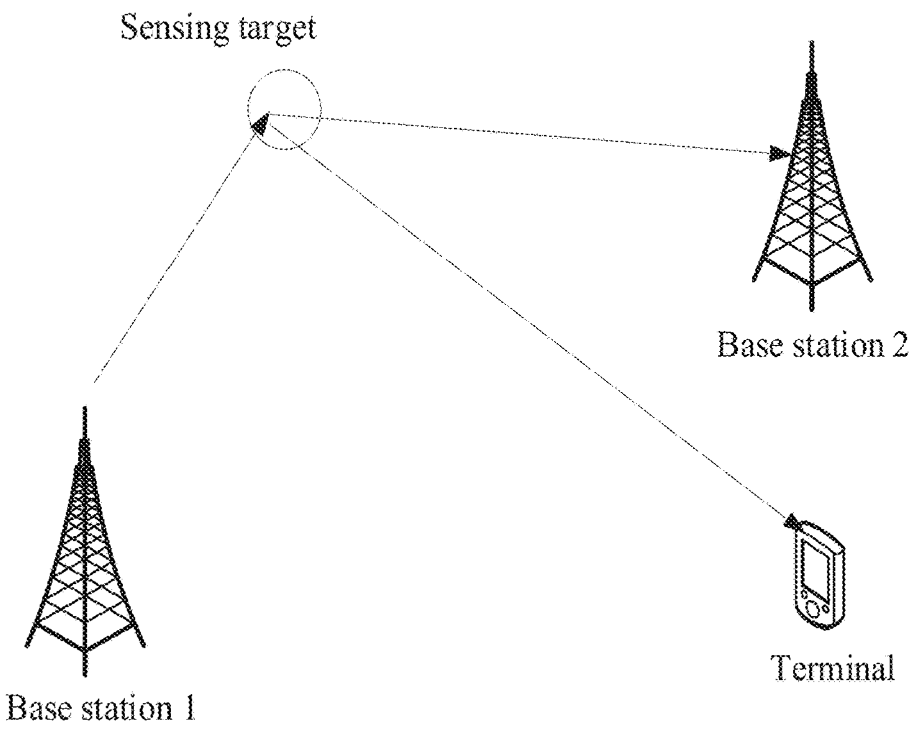
FIG. 3 is another schematic diagram of wireless sensing according to an embodiment of this application.

The passive perception may be that a transceiver is located at a different location, and a receiver performs sensing by using a radio signal transmitted by the transmitter. For example, the first device senses environment information between the first device and the device by receiving a radio signal from another device. As shown in FIG. 3, a base station 1 transmits a signal, and a base station 2 and a terminal senses a target reflected signal.

The interaction perception may be a process in which a subject, a time, a frequency, a format, and the like that are sent by an electromagnetic wave are agreed upon by means of information interaction between a perceiver and a target object, to complete sensing.

In the embodiments of this application, in some scenarios or implementations, both a wireless communication signal and a wireless sensing signal are supported, and an integrated sensing and communication function design is implemented by using an integrated sensing and communication means such as a signal joint design and/or hardware sharing, so that a sensing capability or a sensing service is provided while information transmission is performed. In this way, cost saving, device size reducing, device power consumption reducing, spectrum efficiency improving, reducing of mutual interference between inductors, and system performance improving can be achieved by means of integration of sensing and communication (communication and sensing).

In addition, integrated sensing and communication may include but is not limited to at least one of the following:

- a same network provides a communication service and a sensing service;
- a same terminal provides a communication service and a sensing service;
- a same spectrum provides a communication service and a sensing service; and
- same radio transmission completes an integrated sensing and communication service, that is, a joint design of a communication signal and a sensing signal.

Figure 4:
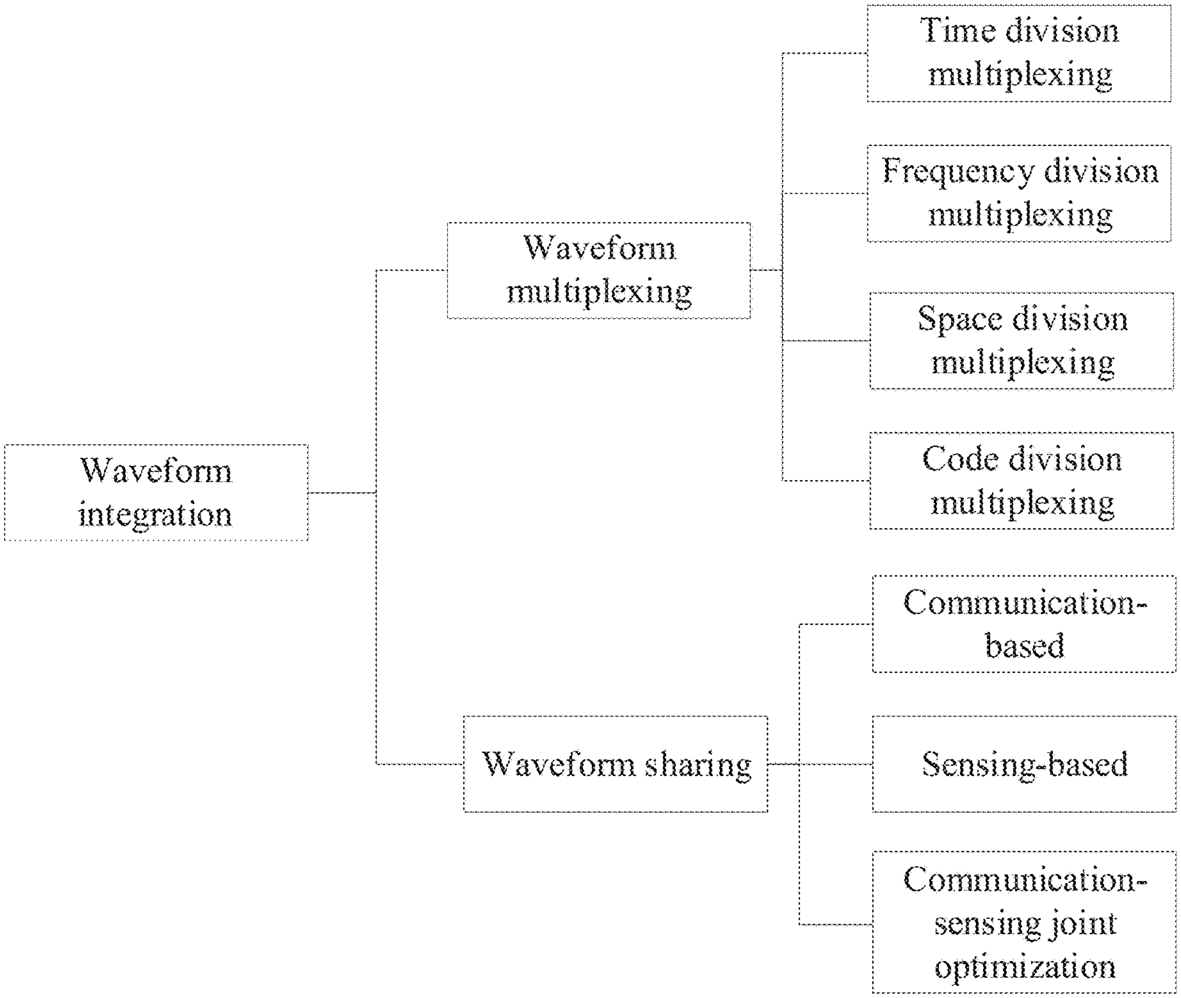
FIG. 4 is a schematic diagram of waveform integration according to an embodiment of this application.

Further, in an integrated sensing and communication technology, waveform integration may be shown in FIG. 4, including waveform multiplexing and waveform sharing, where the waveform multiplexing includes time division multiplexing, frequency division multiplexing, space division multiplexing, and code division multiplexing, and the waveform sharing includes communication-based, sensing-based, and communication-sensing joint optimization.

With reference to the accompanying drawings, the following describes in detail a sensing measurement method, a sensing measurement indication method, a terminal, and a network side device provided in the embodiments of this application by using some embodiments and application scenarios thereof.

Figure 5:
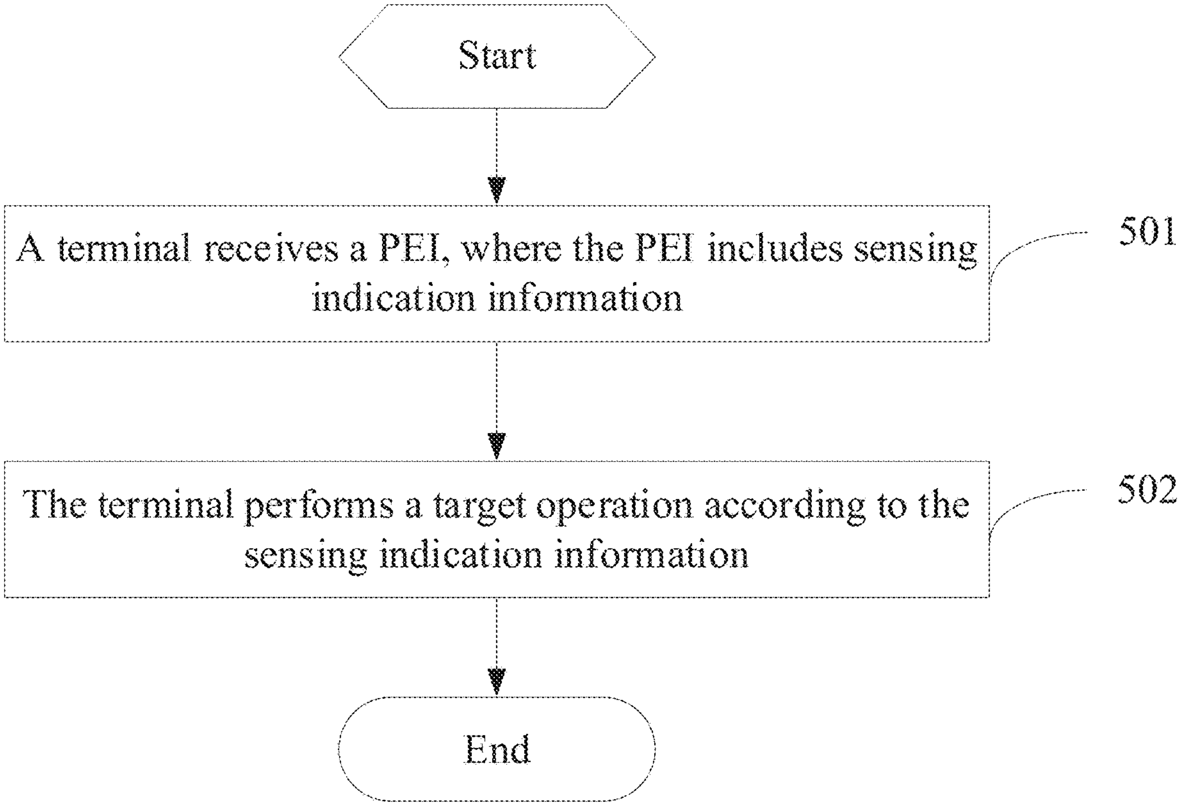
FIG. 5 is a flowchart of a sensing measurement method according to an embodiment of this application.

Referring to FIG. 5, FIG. 5 is a flowchart of a sensing measurement method according to an embodiment of this application. As shown in FIG. 5, the method includes the following steps:

Step 501: A terminal receives a PEI, where the PEI includes sensing indication information.

The PEI may be a PEI that is received by the terminal and that is sent by a network side device, and the foregoing step may be that the terminal receives the PEI in an idle state or an inactive state.

The sensing indication information may indicate a sensing-related behavior of the terminal, and may specifically indicate the terminal to perform sensing measurement, report a sensing measurement quantity, send a signal used to perform sensing measurement, and the like. Further, the sensing indication information may indicate a sensing-related behavior of the terminal in an idle state and/or an inactive state.

The PEI may be alternatively control signaling carried by using a PDCCH or sequence-based control signaling.

Step 502: The terminal performs a target operation according to the sensing indication information, where the target operation includes at least one of the following:

performing sensing measurement on a first signal, and reporting a sensing measurement quantity; and sending, to a target device, a second signal used by the target device to perform sensing measurement.

The first signal may be sent by the network side device to the terminal, or may be sent by another terminal to the terminal. For example, the first signal may be a first signal sent by at least one of a base station, a TRP, an access point (AP), a relay, a reflective intelligence surface (RIS), a terminal, and the like.

The reporting a sensing result of the sensing measurement quantity may be reported by the terminal to the network side device, or may be reported by the terminal to another terminal.

The target device may include at least one of a network side device, a terminal, a TRP, an AP, a relay, an RIS, and the like. In a case that the target device includes a terminal, the terminal may be a terminal that performs device-to-device (D2D) communication with the foregoing terminal.

It should be noted that, in this embodiment of this application, the first signal may be a signal sent by one or more devices, and the second signal may be a signal sent by one or more devices.

In this embodiment of this application, the first signal may include but is not limited to at least one of the following:

a sensing signal, a reference signal, and a synchronization signal.

The sensing signal may be a sensing signal newly defined in this embodiment of this application for performing sensing measurement, or may be a sensing signal defined in a protocol.

The reference signal included in the first signal may include but is not limited to at least one of the following:

a channel state information-reference signal (CSI-RS), a positioning reference signal (PRS), a demodulation reference signal (DMRS), a phase tracking reference signal (PTRS), and a tracking reference signal (TRS).

In this embodiment of this application, the second signal may include but is not limited to at least one of the following:

a sensing signal, a reference signal, and a synchronization signal.

The reference signal included in the second signal may include but is not limited to at least one of the following:

a preamble, a sounding reference signal (SRS), a DMRS, and a PTRS.

The synchronization signal included in the first signal includes but is not limited to at least one of the following:

a primary synchronization signal (PSS), a secondary synchronization signal (SSS), and a synchronization signal block (SSB).

The first signal and the second signal may be alternatively sensing signals, reference signals, and synchronization signals in a sidelink system.

In this embodiment of this application, through the foregoing step, the terminal can perform the target operation according to the sensing indication information included in the PEI, thereby improving sensing performance of the terminal.

In an optional implementation, the sensing indication information includes at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, and terminal identifier information for sending the second signal.

The indication information of the first signal includes but is not limited to at least one of the following:

identifier information of the first signal, a detection cycle of the first signal, a detection offset of the first signal, and terminal identifier information corresponding to the first signal.

The identifier information of the first signal may be an index of the first signal, and the identifier information may flexibly indicate the terminal to sense different signals.

Through at least one of the detection cycle and the detection offset of the first signal, the terminal only needs to perform sensing measurement at a corresponding location, thereby reducing power consumption of the terminal.

The terminal identifier information corresponding to the first signal may be a terminal identifier or a terminal group identifier. The terminal identifier information may be used to indicate only the terminal corresponding to the terminal identifier information to perform sensing measurement on the first signal.

The information about the sensing measurement quantity may indicate content that the terminal needs to measure for the first signal. For example, the information about the sensing measurement quantity may include at least one of the following:

a channel matrix, channel state information, a reference signal received power, a received signal strength indicator, a channel power delay spectrum, a Doppler power spectrum, a Doppler spread, a coherence bandwidth, a coherence time, a power of each path in a multipath channel, a delay of each path in the multipath channel, an angle of each path in the multipath channel, a Doppler frequency shift, a quotient of frequency domain channel responses of a first antenna and a second antenna, a conjugate multiplier of the frequency domain channel responses of the first antenna and the second antenna, an amplitude ratio of received signals of the first antenna and the second antenna, an amplitude difference between the received signals of the first antenna and the second antenna, a phase difference between the first antenna and the second antenna, and angle-related information of the first antenna and the second antenna, where the first antenna and the second antenna are receive antennas of the terminal.

The information about the sensing measurement quantity may be alternatively a measurement quantity obtained by performing a simple operation (including an addition/subtraction/multiplication/division, a matrix addition/subtraction/multiplication, a matrix transposition, a triangular relationship operation, a square root operation, a power operation, and a threshold detection result and a maximum/minimum value extraction result of the operation result) on at least one of the foregoing plurality of items, or a measurement quantity obtained by performing a complex operation (including fast Fourier transform (FFT)/inverse fast Fourier transform (IFFT), discrete Fourier transform (DFT)/inverse discrete Fourier transform (IDFT), 2D-FFT, 3D-FFT, matched filtering, autocorrelation calculation, wavelet transform, digital filtering, a threshold detection result of the foregoing operation result, a maximum/minimum extraction result, and the like) on at least one of the foregoing plurality of items.

The channel state information may include but is not limited to an amplitude and/or a phase of a frequency domain channel response, and inphase and quadrature signal characteristics of the frequency domain channel response. The inphase and the quadrature signal characteristics may include inphase and quadrature signal amplitudes.

The foregoing at least one item may be indicated according to an actual scenario requirement or a service requirement, so that the terminal obtains the corresponding sensing measurement quantity through measurement, thereby improving accuracy of reporting the sensing measurement quantity by the terminal.

Further, the information about the sensing measurement quantity may further include granularity information of the sensing measurement quantity. Through the granularity information, the sensing measurement quantity reported by the terminal can be more accurate.

The resource information for reporting the sensing measurement quantity may include at least one of a frequency domain resource and a time domain resource for reporting the sensing measurement quantity.

The terminal group information may indicate a terminal group corresponding to the sensing indication information. For example, a group is indicated in the PEI, each group corresponds to 2 bits, and a location of the 2 bits represents a group identifier. Details may be shown in Table 2.

TABLE 2

| Terminal group corresponding to the bit | Group 1 | Group 2 | Group 3 | Group 4 | Group 5 |
|---|---|---|---|---|---|
| Bit | 00 | 01 | 00 | 00 | 10 |

The reporting manner of the sensing measurement quantity may indicate a reporting manner of reporting the sensing measurement quantity by the terminal. For example, the reporting manner of the sensing measurement quantity may include one of the following:

initiating a short data transfer (SDT) procedure to report the sensing measurement quantity; and initiating random access to report the sensing measurement quantity.

The foregoing SDT procedure may be a configured grant (CG) SDT procedure, or certainly, may be a non-CG SDT procedure. In addition, a related configuration of the foregoing SDT procedure may be indicated by the network side device.

The initiating random access to report the sensing measurement quantity may be: initiating, by the terminal, random access to report the sensing measurement quantity in a process of initiating random access or after entering a connected state.

In an implementation, the network side device may determine the reporting manner according to a sensing requirement, and the terminal does not need to determine a relationship between a data size and an SDT threshold, but directly performs reporting based on an indication of the network side device.

In an implementation, the reporting manner is associated with a data size of a measurement result corresponding to the sensing measurement quantity, and is determined by the network side device or the terminal. For example, if a data volume of the measurement result≤a threshold 1, the SDT procedure is initiated to report the sensing measurement quantity; or if the threshold 1<the data volume of the measurement result, random access is initiated to report the sensing measurement quantity.

The resource information for sending the second signal may include at least one of a frequency domain resource and a time domain resource.

The indication information of the second signal may include identifier information of the second signal, such as an index of the second signal.

The sending manner of the second signal may indicate a manner in which the terminal sends the second signal. For example, the sending manner of the second signal May include one of the following:

sending the second signal in a four-step random access process;

sending the second signal in a two-step random access process;

initiating an SDT procedure to send the second signal; and initiating random access to send the second signal.

The sending the second signal in a four-step random access process may be that a preamble is sent for sensing, or a DMRS of a message 3 (MSG 3) is sent for sensing.

The sending the second signal in a two-step random access process may be that a preamble in a message A (MSG A) is sent for sensing, or a DMRS in a MSG A is sent for sensing.

The initiating random access to send the second signal may be sending the second signal in a process of initiating random access or after entering a connected state.

The terminal identifier information for sending the second signal may include a terminal identifier or a terminal group identifier for sending the second signal.

It should be noted that some information included in the sensing indication information may be preconfigured or defined in the protocol, for example, a part of information in the indication information of the first signal, the information about the sensing measurement quantity, the resource information for reporting the sensing measurement quantity, the terminal group information, the reporting manner of the sensing measurement quantity, the resource information for sending the second signal, the indication information of the second signal, the sending manner of the second signal, and the terminal identifier information for sending the second signal may be preconfigured or defined in the protocol.

In an optional implementation, the sensing indication information is used to indicate one of the following:

indicating not to detect a paging PDCCH;

indicating to detect a paging PDCCH;

indicating to detect a sensing dedicated PDCCH; and indicating to detect a paging PDCCH and a sensing dedicated PDCCH.

The sensing dedicated PDCCH is a PDCCH dedicated for sensing. In addition, a radio network temporary identifier (RNTI) of the sensing dedicated PDCCH may be different from or may be the same as a paging RNTI (P-RNTI) of the paging PDCCH. In addition, a control resource set (CORESET) and a search space of the sensing dedicated PDCCH may also be different from or may be the same as a CORESET and a search space of the paging PDCCH. This is not limited.

In this implementation, the sensing indication information can flexibly indicate that the terminal only needs to perform corresponding detection, thereby reducing power consumption of the terminal.

Optionally, the performing, by the terminal, a target operation according to the sensing indication information includes at least one of the following:

in a case that the sensing indication information indicates to detect a paging PDCCH, detecting, by the terminal, a paging PDCCH, and performing the target operation according to indication content of the detected paging PDCCH;

in a case that the sensing indication information indicates to detect a sensing dedicated PDCCH, detecting, by the terminal, a sensing dedicated PDCCH, and performing the target operation according to indication content of the detected sensing dedicated PDCCH;

in a case that the sensing indication information indicates to detect a sensing dedicated PDCCH, detecting, by the terminal, a sensing dedicated PDCCH, and demodulating a physical downlink shared channel (PDSCH) according to the detected sensing dedicated PDCCH, and if a terminal identifier in the PDSCH is associated with the terminal, performing the target operation according to indication content of the dedicated PDCCH or the PDSCH;

in a case that the sensing indication information indicates to detect a paging PDCCH and a sensing dedicated PDCCH, detecting, by the terminal, a sensing dedicated PDCCH and a paging PDCCH, and performing the target operation according to indication content of the detected sensing dedicated PDCCH; and in a case that the sensing indication information indicates to detect a paging PDCCH and a sensing dedicated PDCCH, detecting, by the terminal, a sensing dedicated PDCCH and a paging PDCCH, demodulating a PDSCH according to the detected sensing dedicated PDCCH, and if a terminal identifier in the PDSCH is associated with the terminal, performing the target operation according to indication content of the dedicated PDCCH or the PDSCH.

The terminal identifier in the PDSCH may include a terminal identifier or an identifier of a group in which the terminal is located.

In this implementation, the target operation may be performed according to the indication content of the dedicated PDCCH, the indication content of the PDSCH, or the indication content of the paging PDCCH, thereby improving sensing performance of the terminal.

Optionally, the indication content of the dedicated PDCCH, the indication content of the PDSCH, or the indication content of the paging PDCCH includes at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, and terminal identifier information for sending the second signal.

For at least one of the foregoing items, refer to the corresponding descriptions of at least one item of the sensing indication information included in the foregoing implementation. Details are not described herein again.

In an optional implementation, the sensing indication information is carried in a sensing-associated bit carried in the PEI.

For example, as shown in Table 3, the sensing-associated bit is 2 bits, and the 2 bits are used to indicate a behavior of the terminal.

TABLE 3

| 2 bits of the PEI | Terminal behavior |
|---|---|
| 00 | The paging PDCCH does not need to be monitored (that is, there is no sensing or communication requirement). |
| 01 | The paging PDCCH needs to be monitored (that is, there is only a communication requirement). |
| 10 | The paging PDCCH needs to be monitored, or the sensing dedicated PDCCH needs to be monitored (that is, there is only a sensing requirement). |
| 11 | The paging PDCCH needs to be monitored (the paging PDCCH indicates sensing configuration information), or the paging PDCCH and the sensing dedicated PDCCH need to be monitored (that is, both sensing and communication exist). |

In an optional implementation, the sensing indication information is carried in a sensing indication bit that is in at least one group of sensing indication bits carried in the PEI and that is associated with a terminal group in which the terminal is located.

In this implementation, the PEI may include at least one group of sensing indication bits, and each group of sensing indication bits is associated with one terminal group. In addition, each group of sensing indication bits may be 2 bits. Details may be shown in the foregoing Table 3.

The PEI may include at least one group of sensing indication bits. In this way, one PEI may indicate sensing behaviors of a plurality of terminal groups, thereby reducing transmission overheads.

In an optional implementation, the method further includes:

receiving, by the terminal, configuration signaling, where the configuration signaling is used to indicate sensing configuration information; and the performing, by the terminal, a target operation according to the sensing indication information includes:

performing, by the terminal, the target operation according to the sensing indication information and the sensing configuration information.

The sensing configuration information may include at least one set of sensing configuration information, and the sensing configuration information is used by the terminal to perform the target operation.

The configuration signaling may include one or more pieces of broadcast signaling, such as an SIB or RRC signaling.

The performing, by the terminal, the target operation according to the sensing indication information and the sensing configuration information may include:

performing, by the terminal, the target operation according to target information, where the target information includes information indicated by the sensing indication information in the sensing configuration information.

In this way, the sensing indication information only needs to indicate information in the sensing configuration information, and does not need to carry specific information. For example, the sensing indication information only needs to carry an index of a signal, an index of a resource, an index of a sensing measurement quantity, and the like, thereby reducing PEI overheads.

It should be noted that, in this implementation, that the terminal performs the target operation according to the target information is not limited. For example, in some implementations, the sensing configuration information may include information not related to content indicated by the sensing indication information, so that the terminal performs the target operation according to the information indicated by the sensing indication information and the information that is included in the sensing configuration information and that is not related to the content indicated by the sensing indication information. For example, in some implementations, the sensing configuration information configures a unique resource for reporting a measurement quantity, and therefore the sensing indication information does not need to indicate resource information for reporting the measurement quantity. For another example, in some implementations, the sensing configuration information configures a unique first signal, and therefore the sensing indication information does not need to indicate information about the first signal.

In the foregoing implementation, the terminal performs the target operation according to the sensing indication information and the sensing configuration information, so that PEI overheads can be reduced because the sensing configuration information does not need to be carried in the PEI.

Optionally, the sensing configuration information includes at least one of the following:

identifier information of at least one type of signal used for sensing measurement, configuration information of at least one type of signal used for sensing measurement, at least one type of information about the sensing measurement quantity, at least one type of resource information for reporting the sensing measurement quantity, and terminal identifier information.

The identifier information of at least one type of signal used for sensing measurement may include a number or an index of the at least one signal, for example, an index of a signal shown in Table 4 or Table 5.

TABLE 4

| Index | Downlink reference signal or synchronization signal |
|---|---|
| 1 | DMRS of an SIB 1 |
| 2 | TRS |
| 3 | SSB 1 |
| 4 | SSB 2 |
| 5 | DMRS of a PBCH |
| 6 | . . . |

The DMRS corresponding to the index 1 is a DMRS in a system information block (SIB) 1, and the DMRS corresponding to the index 5 is a DMRS in a physical broadcast channel (PBCH). The TRS may be a TRS in idle mode, the SSB 1 may be a cell-defining SSB, and the SSB 2 may be a non-cell-defining SSB.

TABLE 5

| Index | Reference signal or synchronization signal |
|---|---|
| 1 | SRS |
| 2 | PTRS |
| 3 | . . . |

It should be noted that the identifier information of at least one type of signal used for sensing measurement may be alternatively defined in the protocol. For example, configuration information of the first signal is indicated in another SIB, for example, a TRS (TRS in idle mode) in idle mode supports indication by the SIB. Alternatively, the foregoing Table 4 is defined in the protocol.

The configuration information of at least one type of signal used for sensing measurement may include at least one of the following:

time resource information, frequency resource information, a code division multiplexing (CDM) type, resource mapping, a density, port information, and the like.

The CDM type may include a CDM value and a mode, and the resource mapping may include an orthogonal frequency division multiplexing (OFDM) symbol and subcarrier occupation information of a resource in a slot.

In addition, the configuration information of at least one type of signal used for sensing measurement may be alternatively preconfigured or agreed upon in the protocol.

The at least one type of information about the sensing measurement quantity, may include at least one sensing measurement quantity and a corresponding number or index, for example, content shown in Table 6.

TABLE 6

| Index | Reference signal or synchronization signal |
|---|---|
| 1 | RSRP |
| 2 | Doppler spread |
| 3 | AOA |
| 4 | . . . |

The foregoing AOA is an angle of arrival (AOA).

Further, the at least one type of information about the sensing measurement quantity may be agreed upon in the protocol. For example, the protocol defines the foregoing Table 5. Certainly, the foregoing Table 6 is only a simple schematic table.

The at least one type of resource information for reporting the sensing measurement quantity may include at least one of a time domain resource, frequency domain information, and the like for reporting the sensing measurement quantity, and a corresponding number or index.

The terminal identifier information may include at least one of the following:

a terminal group rule, a terminal group identifier, and a terminal identifier.

The terminal group identifier may include a terminal group index identifier and an associated terminal identifier characteristic, to identify a group to which the terminal belongs and a terminal in the group, so that overheads of the terminal identifier can be reduced by using the terminal group identifier. For example, the terminal group identifier may be obtained by performing an operation such as a hash function operation on a terminal identifier.

The terminal identifier may include a terminal core network identifier such as a 5G globally unique temporary identity (5G-GUTI), a 5G shortened form-temporary mobile subscriber identity (5G-S-TMSI), a 5G temporary mobile subscriber identity (5G-TMSI), and a subscription concealed identifier (SUCI); or the terminal identifier may include a terminal radio access network identifier such as an inactive radio network temporary identifier (I-RNTI) or an RAN UE NGAP ID, where the RAN UE NGAP ID is an identifier that is sent by a base station to an AMF and that is used to identify a base station end connected to a control panel of the terminal on an NG interface.

In this embodiment of this application, a terminal receives a PEI, where the PEI includes sensing indication information; and the terminal performs a target operation according to the sensing indication information, where the target operation includes at least one of the following: performing sensing measurement on a first signal, and reporting a sensing measurement quantity; and sending, to a target device, a second signal used by the target device to perform sensing measurement. In this way, the terminal performs the target operation according to the sensing indication information included in the PEI, thereby improving sensing performance of the terminal.

Figure 6:
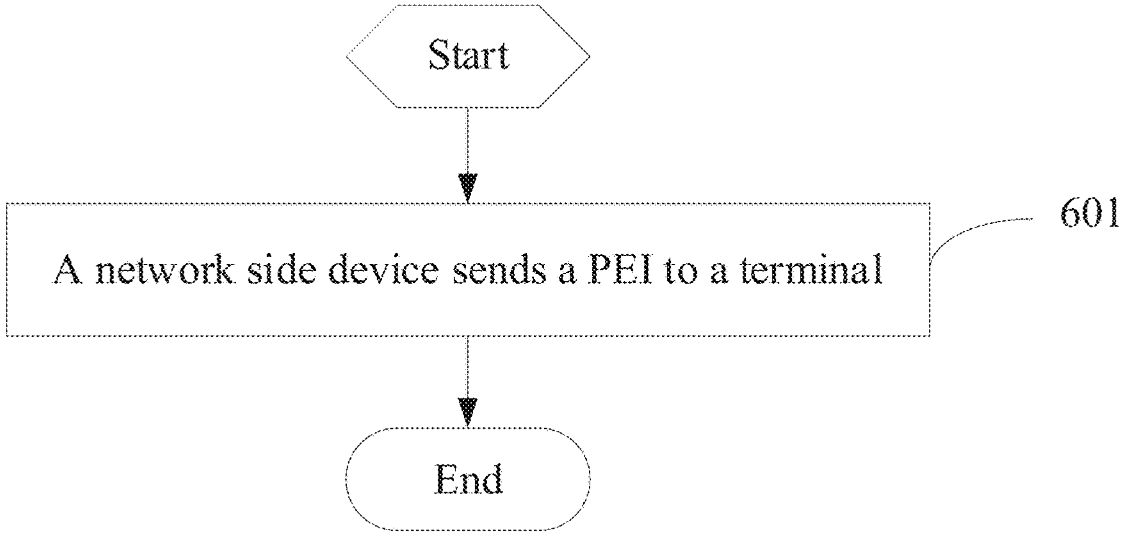
FIG. 6 is a flowchart of a sensing measurement indication method according to an embodiment of this application.

Referring to FIG. 6, FIG. 6 is a flowchart of a sensing measurement indication method according to an embodiment of this application. As shown in FIG. 6, the method includes the following steps:

Step 601: A network side device sends a PEI to a terminal, where the PEI includes sensing indication information, the sensing indication information is used by the terminal to perform a target operation, and the target operation includes at least one of the following:

performing sensing measurement on a first signal, and reporting a sensing measurement quantity; and sending, to a target device, a second signal used by the target device to perform sensing measurement.

Optionally, the method further includes at least one of the following:

sending, by the network side device, the first signal to the terminal;

receiving, by the network side device, the sensing measurement quantity reported by the terminal; and performing, by the network side device, sensing measurement on the second signal sent by the terminal.

The sensing measurement quantity reported by the terminal is a sensing measurement quantity obtained by the terminal by performing sensing measurement on the first signal. It should be noted that the first signal is not limited to be sent by the network side device to the terminal. For example, the first signal may be alternatively a first signal sent by another terminal or a relay to the terminal.

Optionally, the sensing indication information includes at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, and terminal identifier information for sending the second signal.

Optionally, the sensing indication information is used to indicate one of the following:

indicating not to detect a paging physical downlink control channel PDCCH;

indicating to detect a paging PDCCH;

indicating to detect a sensing dedicated PDCCH; and indicating to detect a paging PDCCH and a sensing dedicated PDCCH.

Optionally, in a case that the sensing indication information indicates to detect a paging PDCCH, indication content of the paging PDCCH is used by the terminal to perform the target operation;

in a case that the sensing indication information indicates to detect a sensing dedicated PDCCH, indication content of the sensing dedicated PDCCH is used by the terminal to perform the target operation;

in a case that the sensing indication information indicates to detect a sensing dedicated PDCCH, the sensing dedicated PDCCH is used by the terminal to demodulate a physical downlink shared channel PDSCH, and if a terminal identifier in the PDSCH is associated with the terminal, indication content of the dedicated PDCCH or the PDSCH is used by the terminal to perform the target operation;

in a case that the sensing indication information indicates to detect a paging PDCCH and a sensing dedicated PDCCH, indication content of the sensing dedicated PDCCH is used by the terminal to perform the target operation; and in a case that the sensing indication information indicates to detect a paging PDCCH and a sensing dedicated PDCCH, the sensing dedicated PDCCH is used by the terminal to demodulate a PDSCH, and if a terminal identifier in the PDSCH is associated with the terminal, indication content of the dedicated PDCCH or the PDSCH is used by the terminal to perform the target operation.

Optionally, the indication content of the dedicated PDCCH, the indication content of the PDSCH, or the indication content of the paging PDCCH includes at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, and terminal identifier information for sending the second signal.

Optionally, the indication information of the first signal includes at least one of the following:

identifier information of the first signal, a detection cycle of the first signal, a detection offset of the first signal, and terminal identifier information corresponding to the first signal.

Optionally, the information about the sensing measurement quantity includes at least one of the following:

a channel matrix, channel state information, a reference signal received power, a received signal strength indicator, a channel power delay spectrum, a Doppler power spectrum, a Doppler spread, a coherence bandwidth, a coherence time, a power of each path in a multipath channel, a delay of each path in the multipath channel, an angle of each path in the multipath channel, a Doppler frequency shift, a quotient of frequency domain channel responses of a first antenna and a second antenna, a conjugate multiplier of the frequency domain channel responses of the first antenna and the second antenna, an amplitude ratio of received signals of the first antenna and the second antenna, an amplitude difference between the received signals of the first antenna and the second antenna, a phase difference between the first antenna and the second antenna, and angle-related information of the first antenna and the second antenna, where the first antenna and the second antenna are receive antennas of the terminal.

Optionally, the information about the sensing measurement quantity further includes granularity information of the sensing measurement quantity.

Optionally, the reporting manner of the sensing measurement quantity includes one of the following:

initiating a short data transfer SDT procedure to report the sensing measurement quantity; and initiating random access to report the sensing measurement quantity.

Optionally, the sending manner of the second signal includes one of the following:

sending the second signal in a four-step random access process;

sending the second signal in a two-step random access process;

initiating an SDT procedure to send the second signal; and initiating random access to send the second signal.

Optionally, the sensing indication information is carried in a sensing-associated bit carried in the PEI; or the sensing indication information is carried in a sensing indication bit that is in at least one group of sensing indication bits carried in the PEI and that is associated with a terminal group in which the terminal is located.

Optionally, the method further includes:

sending, by the network side device, configuration signaling to the terminal, where the configuration signaling is used to indicate sensing configuration information.

Optionally, the sensing configuration information includes at least one of the following:

identifier information of at least one type of signal used for sensing measurement, configuration information of at least one type of signal used for sensing measurement, at least one type of information about the sensing measurement quantity, at least one type of resource information for reporting the sensing measurement quantity, and terminal identifier information.

Optionally, the terminal identifier information includes at least one of the following:

a terminal group rule, a terminal group identifier, and a terminal identifier.

Optionally, the first signal includes at least one of the following:

a sensing signal, a reference signal, and a synchronization signal; and/or the second signal includes at least one of the following:

a sensing signal, a reference signal, and a synchronization signal.

Optionally, the reference signal included in the first signal includes at least one of the following:

a channel state information-reference signal CSI-RS, a positioning reference signal PRS, a demodulation reference signal DMRS, a phase tracking reference signal PTRS, and a tracking reference signal TRS; and/or the reference signal included in the second signal includes at least one of the following:

a preamble, an SRS, a DMRS, and a PTRS.

It should be noted that this embodiment is used as an implementation of the network side device corresponding to the embodiment shown in FIG. 5. For a specific implementation of this embodiment, refer to the related descriptions of the embodiment shown in FIG. 5. To avoid repetition, details are not described in this embodiment again.

The following uses an example in which the first signal or the second signal is a sensing signal or a reference signal to describe the method provided in this embodiment of this application.

Embodiment 1

In this embodiment, a hierarchical indication is adopted. Specifically, a broadcast message and a PEI are used to indicate a terminal to detect a downlink sensing signal. Specifically, the following steps may be included:

Step (1): A terminal receives one or more pieces of broadcast signaling such as SIB, or RRC signaling sent by a network side device, where the one or more pieces of broadcast signaling or RRC signaling indicate at least one of the following:

numbers (or indexes) of one or more sensing signals or reference signals, where for details, refer to the example in the foregoing Table 4; and it should be noted that configuration information of the sensing signal or the reference signal is indicated in another SIB, for example, a TRS in tan idle state is indicated by the SIB; or the foregoing Table 4 may be defined in a protocol;

configuration information of one or more sensing signals or reference signals, where the configuration information includes time resource information, frequency resource information, a CDM type (including a CDM value and a mode), resource mapping (that is, an orthogonal frequency division multiplexing symbol and subcarrier occupancy information of a resource in a slot), a density, port information, and the like;

a sensing measurement quantity and a corresponding number (or index), where for details, refer to the foregoing Table 6; and it should be noted that Table 6 may also be defined in the protocol;

a granularity of the sensing measurement quantity and a corresponding number, where the granularity of the sensing measurement quantity and the corresponding number may be jointly coded and indicated with the foregoing sensing measurement quantity and the corresponding number;

a time resource and a frequency resource for reporting the sensing measurement quantity and a corresponding number; and a terminal group rule, or a terminal group index ID and an associated terminal ID characteristic, and a terminal ID (which may also be referred to as a sensing terminal ID), where the terminal ID may be, for example, a terminal core network identifier such as a 5G-GUTI, a 5G-S-TMSI, a 5G-TMSI, or an SUCI, or may be a terminal radio access network identifier such as an I-RNTI or an RAN UE NGAP ID.

Step (2): The terminal receives a PEI (an early indication message) sent by the network side device, where the PEI indicates at least one of an index of a sensing signal or a reference signal that needs to be measured, an index of a sensing measurement quantity, a granularity index of the sensing measurement quantity, an index of a time resource and a frequency resource for reporting the sensing measurement quantity, and a terminal group index.

Step (3): The terminal detects the corresponding sensing signal or reference signal according to the indication (the broadcast signaling and the PEI) of the network side device.

Step (4): The terminal reports the sensing measurement quantity to the network side device or a core network according to the indication (the broadcast signaling and the PEI) of the network side device.

Embodiment 2

In this embodiment, a hierarchical indication is adopted. Specifically, a broadcast message, a PEI that does not support a terminal group indication, a paging PDCCH/sensing dedicated PDCCH are used to indicate a terminal to detect a downlink sensing signal.

Specifically, the PEI indicates the paging PDCCH, and then the paging PDCCH or the sensing dedicated PDCCH indicates specific sensing information. The following may be specifically included:

A terminal receives one or more pieces of broadcast signaling such as SIB, or RRC signaling sent by a network side device, where the one or more pieces of broadcast signaling or RRC signaling indicate at least one of the following:

numbers (or indexes) of one or more sensing signals or reference signals, where for details, refer to the example in the foregoing Table 4; and it should be noted that configuration information of the sensing signal or the reference signal is indicated in another SIB, for example, a TRS in tan idle state is indicated by the SIB; or the foregoing Table 4 may be defined in a protocol;

configuration information of one or more sensing signals or reference signals, where the configuration information includes time resource information, frequency resource information, a CDM type (including a CDM value and a mode), resource mapping (that is, an orthogonal frequency division multiplexing symbol and subcarrier occupancy information of a resource in a slot), a density, port information, and the like;

a sensing measurement quantity and a corresponding number (or index), where for details, refer to the foregoing Table 6; and it should be noted that Table 6 may also be defined in the protocol;

a granularity of the sensing measurement quantity and a corresponding number, where the granularity of the sensing measurement quantity and the corresponding number may be jointly coded and indicated with the foregoing sensing measurement quantity and the corresponding number;

a time resource and a frequency resource for reporting the sensing measurement quantity and a corresponding number; and a terminal group rule, or a terminal group index ID and an associated terminal ID characteristic, and a terminal ID (which may also be referred to as a sensing terminal ID), where the terminal ID may be, for example, a terminal core network identifier such as a 5G-GUTI, a 5G-S-TMSI, a 5G-TMSI, or an SUCI, or may be a terminal radio access network identifier such as an I-RNTI or an RAN UE NGAP ID.

The terminal receives the PEI sent by the network side device, where a bit in the PEI and a corresponding terminal behavior are shown in the foregoing Table 3. Specifically, if the terminal detects the PEI, the terminal behavior is selected according to an indication of two bits in the PEI, which is specifically as follows:

If the terminal detects that a sensing-associated bit in the PEI is 00, the terminal does not need to detect a paging PDCCH.

If the terminal detects that a sensing-associated bit in the PEI is 01, the terminal needs to detect a paging PDCCH.

If the terminal detects that a sensing-associated bit in the PEI is 10, the terminal behavior is as follows:

The terminal needs to detect a paging PDCCH, detect a sensing signal or a reference signal according to an indication of the paging PDCCH, obtain a sensing measurement quantity, and report the sensing measurement quantity; or the terminal needs to monitor a sensing dedicated PDCCH, monitor a sensing signal according to an indication of the sensing dedicated PDCCH, obtain a sensing measurement quantity, and report the sensing measurement quantity; or the terminal needs to monitor a sensing dedicated PDCCH, demodulate a corresponding PDSCH according to the sensing dedicated PDCCH, and if a terminal ID in the PDSCH or an ID of a group in which the terminal is located is associated with the terminal, detect a sensing signal or a reference signal according to an indication of the sensing dedicated PDCCH/PDSCH, obtain a sensing measurement quantity, and report the sensing measurement quantity.

Optionally, an RNTI of the sensing dedicated PDCCH is different from a P-RNTI of the paging PDCCH, and a CORESET and a search space are different from a CORESET and a search space of the paging PDCCH.

If the terminal detects that a sensing-associated bit in the PEI is 11, the terminal behavior is as follows:

The terminal needs to monitor a paging PDCCH, detect a sensing signal according to an indication of the paging PDCCH, obtain a sensing measurement quantity, and report the sensing measurement quantity; or the terminal needs to monitor a paging PDCCH and a sensing dedicated PDCCH, detect a sensing signal according to an indication of the sensing dedicated PDCCH, obtain a sensing measurement quantity, and report the sensing measurement quantity; or the terminal needs to monitor a paging PDCCH and a sensing dedicated PDCCH, demodulate a corresponding PDSCH according to the sensing dedicated PDCCH, and if a terminal ID in the PDSCH or an ID of a group in which the terminal is located is associated with the terminal, detect a sensing signal or a reference signal according to an indication of the sensing dedicated PDCCH/PDSCH, obtain a sensing measurement quantity, and report the sensing measurement quantity.

Indication content of the paging PDCCH/sensing dedicated PDCCH/PDSCH includes at least one of the following:

a sensing signal or a reference signal (or a synchronization signal) that needs to be detected by the terminal, where the sensing signal or the reference signal includes at least one of the following: a DMRS of a PBCH, a DMRS of an SIB 1, or a PSS and an SSS of an SSB (including a cell-defining SSB and a non-cell-defining SSB); a TRS in idle mode; and a synchronization signal (SS) and a narrowband reference signal (NRS) of narrowband Internet of Things (NB-IoT) and enhanced machine-type communication (eMTC) systems; or a sensing dedicated signal, where the sensing dedicated signal may be a 6G or 5G-evolved sensing dedicated signal;

a detection cycle and a detection offset of the sensing signal or the reference signal that needs to be detected by the terminal, where the detection cycle may be different from a cycle of the reference signal;

a sensing measurement quantity that needs to be measured by the terminal, including at least one of the followings: a channel matrix H, channel state information (for example, an amplitude and/or a phase of a frequency domain channel response, or inphase and the quadrature signal characteristics of the frequency domain channel response, for example, inphase and quadrature signal amplitudes), a reference signal received power, a received signal strength indicator, a channel power delay spectrum, a Doppler power spectrum, a Doppler spread, a coherence bandwidth, a coherence time, a power of each path in a multipath channel (including at least a first-arrival path, a line of sight (LOS) path, a first-order reflection path, and a multi-order reflection path), a delay of each path in the multipath channel, an angle of each path in the multipath channel, a Doppler frequency shift, a quotient or a conjugate multiplier of frequency domain channel responses of a first antenna and a second antenna, an amplitude ratio or an amplitude difference between received signals of the first antenna and the second antenna, a phase difference between the first antenna and the second antenna, a delay difference between the first antenna and the second antenna, and angle-related information of the first antenna and the second antenna, for example, an angle of arrival or an angle of departure (including terminal-side angle information, network side device angle information, and reflection point angle information) between the first antenna and the second antenna;

a time resource, a frequency resource, and the like for reporting the sensing measurement quantity by the terminal;

a terminal ID or a terminal group ID of the sensing signal or the reference signal that needs to be detected; and a reporting manner of the sensing measurement quantity.

The reporting manner of the sensing measurement quantity includes at least one of the following:

Manner 1: The terminal initiates SDT to report the sensing measurement quantity.

Manner 2: The terminal initiates random access, and reports the sensing measurement quantity after entering a connected state.

An SDT configuration or a CG-SDT configuration is indicated by the network side device. In addition, the network side may determine a reporting manner according to a sensing requirement, and the terminal does not need to determine a relationship between a data size and an SDT threshold.

Optionally, the reporting manner is associated with a data size of a measurement result corresponding to a measurement quantity, and is determined by the network side, for example, if a data volume of the measurement result is ≤d1, the manner 1 is selected; or if d1<the data volume of the measurement result, the manner 2 is selected, where d1 represents a preset threshold.

Embodiment 3

In this embodiment, a hierarchical indication is adopted. Specifically, a broadcast message, a PEI that supports a terminal group indication, and a paging PDCCH/sensing dedicated PDCCH are used to indicate a terminal to detect a downlink sensing signal. The following may be specifically included:

A terminal receives one or more pieces of broadcast signaling such as SIB, or RRC signaling sent by a network side device, where the one or more pieces of broadcast signaling or RRC signaling indicate at least one of the following:

numbers (or indexes) of one or more sensing signals or reference signals, where for details, refer to the example in the foregoing Table 4; and it should be noted that configuration information of the sensing signal or the reference signal is indicated in another SIB, for example, a TRS in tan idle state is indicated by the SIB; or the foregoing Table 4 may be defined in a protocol;

configuration information of one or more sensing signals or reference signals, where the configuration information includes time resource information, frequency resource information, a CDM type (including a CDM value and a mode), resource mapping (that is, an orthogonal frequency division multiplexing symbol and subcarrier occupancy information of a resource in a slot), a density, port information, and the like;

a sensing measurement quantity and a corresponding number (or index), where for details, refer to the foregoing Table 6; and it should be noted that Table 6 may also be defined in the protocol;

a granularity of the sensing measurement quantity and a corresponding number, where the granularity of the sensing measurement quantity and the corresponding number may be jointly coded and indicated with the foregoing sensing measurement quantity and the corresponding number;

a time resource and a frequency resource for reporting the sensing measurement quantity and a corresponding number; and a terminal group rule, or a terminal group index ID and an associated terminal ID characteristic, and a terminal ID (which may also be referred to as a sensing terminal ID), where the terminal ID may be, for example, a terminal core network identifier such as a 5G-GUTI, a 5G-S-TMSI, a 5G-TMSI, or an SUCI, or may be a terminal radio access network identifier such as an I-RNTI or an RAN UE NGAP ID.

The terminal receives the PEI sent by the network side device, where a bit in the PEI and a corresponding terminal behavior are shown in the foregoing Table 3. Specifically, if the terminal detects the PEI, the terminal behavior is selected according to an indication of two bits in the PEI, which is specifically as follows:

If the terminal detects that a bit associated with the group in which the terminal is located in the PEI is 00, the terminal does not need to detect Paging PDCCH.

If the terminal detects that the bit associated with a group in which the terminal is located in the PEI is 01, the terminal needs to detect a paging PDCCH.

If the terminal detects that a bit associated with a group in which the terminal is located in the PEI is 10, the terminal behavior is as follows:

The terminal needs to detect a paging PDCCH, detect a sensing signal or a reference signal according to an indication of the paging PDCCH, obtain a sensing measurement quantity, and report the sensing measurement quantity; or the terminal needs to monitor a sensing dedicated PDCCH, monitor a sensing signal according to an indication of the sensing dedicated PDCCH, obtain a sensing measurement quantity, and report the sensing measurement quantity; or the terminal needs to monitor a sensing dedicated PDCCH, demodulate a corresponding PDSCH according to the sensing dedicated PDCCH, and if a terminal ID in the PDSCH or an ID of a group in which the terminal is located is associated with the terminal, detect a sensing signal or a reference signal according to an indication of the sensing dedicated PDCCH/PDSCH, obtain a sensing measurement quantity, and report the sensing measurement quantity.

If the terminal detects that a bit associated with a group in which the terminal is located in the PEI is 11, the terminal behavior is as follows:

The terminal needs to monitor a paging PDCCH, monitor a sensing signal according to an indication of the paging PDCCH, obtain a sensing measurement quantity, and report the sensing measurement quantity; or the terminal needs to monitor a paging PDCCH and a sensing dedicated PDCCH, monitor a sensing signal according to an indication of the sensing dedicated PDCCH, obtain a sensing measurement quantity, and report the sensing measurement quantity; or the terminal needs to monitor a paging PDCCH and a sensing dedicated PDCCH, demodulate a corresponding PDSCH according to the sensing dedicated PDCCH, and if a terminal ID in the PDSCH or an ID of a group in which the terminal is located is associated with the terminal, detect a sensing signal or a reference signal according to an indication of the sensing dedicated PDCCH/PDSCH, obtain a sensing measurement quantity, and report the sensing measurement quantity.

Indication content of the paging PDCCH/sensing dedicated PDCCH/PDSCH includes at least one of the following:

a sensing signal or a reference signal (or a synchronization signal) that needs to be detected by the terminal, where the sensing signal or the reference signal includes at least one of the following: a DMRS of a PBCH, a DMRS of an SIB 1, or a PSS and an SSS of an SSB (including a cell-defining SSB and a non-cell-defining SSB); a TRS in idle mode; an SS and an NRS of NB-IoT and eMTC systems; or a sensing dedicated signal, where the sensing dedicated signal may be a 6G or 5G-evolved sensing dedicated signal;

a detection cycle and a detection offset of the sensing signal or the reference signal that needs to be detected by the terminal, where the detection cycle may be different from a cycle of the reference signal;

a sensing measurement quantity that needs to be measured by the terminal, including at least one of the followings: a channel matrix H, channel state information (for example, an amplitude and/or a phase of a frequency domain channel response, or inphase and the quadrature signal characteristics of the frequency domain channel response, for example, inphase and quadrature signal amplitudes), a reference signal received power, a received signal strength indicator, a channel power delay spectrum, a Doppler power spectrum, a Doppler spread, a coherence bandwidth, a coherence time, a power of each path in a multipath channel (including at least a first-arrival path, a line of sight (LOS) path, a first-order reflection path, and a multi-order reflection path), a delay of each path in the multipath channel, an angle of each path in the multipath channel, a Doppler frequency shift, a quotient or a conjugate multiplier of frequency domain channel responses of a first antenna and a second antenna, an amplitude ratio or an amplitude difference between received signals of the first antenna and the second antenna, a phase difference between the first antenna and the second antenna, a delay difference between the first antenna and the second antenna, and angle-related information of the first antenna and the second antenna, for example, an angle of arrival or an angle of departure (including terminal-side angle information, network side device angle information, and reflection point angle information) between the first antenna and the second antenna;

a time resource, a frequency resource, and the like for reporting the sensing measurement quantity by the terminal;

a terminal ID or a terminal group ID of the sensing signal or the reference signal that needs to be detected; and a reporting manner of the sensing measurement quantity.

The reporting manner of the sensing measurement quantity includes at least one of the following:

Manner 1: The terminal initiates SDT to report the sensing measurement quantity.

Manner 2: The terminal initiates random access, and reports the sensing measurement quantity after entering a connected state.

An SDT configuration or a CG-SDT configuration is indicated by the network side device. In addition, the network side may determine a reporting manner according to a sensing requirement, and the terminal does not need to determine a relationship between a data size and an SDT threshold.

Optionally, the reporting manner is associated with a data size of a measurement result corresponding to a measurement quantity, and is determined by the network side, for example, if a data volume of the measurement result is ≤d1, the manner 1 is selected; or if d1<the data volume of the measurement result, the manner 2 is selected, where d1 represents a preset threshold.

Embodiment 4

In this embodiment, a hierarchical indication is adopted. Specifically, a broadcast message and a PEI are used to indicate a terminal to send an uplink sensing signal. Specifically, the following steps may be included:

Step (1): A terminal receives one or more pieces of broadcast signaling such as SIB, or RRC signaling sent by a network side device, where the one or more pieces of broadcast signaling or RRC signaling indicate at least one of the following:

numbers (or indexes) of one or more sensing signals or reference signals, where for details, refer to the example in the foregoing Table 5; or the foregoing Table 5 is defined in a protocol;

configuration information of one or more sensing signals or reference signals, where the configuration information includes time resource information, frequency resource information, a CDM type (including a CDM value and a mode), resource mapping (that is, an orthogonal frequency division multiplexing symbol and subcarrier occupancy information of a resource in a slot), a density, port information, and the like; and a terminal group rule, or a terminal group index ID and an associated terminal ID characteristic, and a terminal ID (which may also be referred to as a sensing terminal ID), where the terminal ID may be, for example, a terminal core network identifier such as a 5G-GUTI, a 5G-S-TMSI, a 5G-TMSI, or an SUCI, or may be a terminal radio access network identifier such as an I-RNTI or an RAN UE NGAP ID.

Step (2): The terminal receives a PEI (an early indication message) sent by the network side device, where the PEI indicates at least one of a sensing signal or a reference signal that needs to be sent and a terminal group index.

Step (3): The terminal sends the corresponding sensing signal or reference signal according to the indication (the broadcast signaling and the PEI) of the network side device.

Step (4): The network side device detects the sensing signal or the reference signal sent by the terminal to obtain a sensing measurement quantity, and sends the sensing measurement quantity to a core network element.

Embodiment 5

In this embodiment, a hierarchical indication is adopted. Specifically, a broadcast message, a PEI that does not support terminal grouping, a paging PDCCH/sensing dedicated PDCCH are used to indicate a terminal to send an uplink sensing signal. Specifically, the PEI indicates the paging PDCCH, and then the paging PDCCH or the sensing dedicated PDCCH indicates specific sensing information. The following may be specifically included:

A terminal receives one or more pieces of broadcast signaling such as SIB, or RRC signaling sent by a network side device, where the one or more pieces of broadcast signaling or RRC signaling indicate at least one of the following:

numbers (or indexes) of one or more uplink sensing signals or reference signals, where for details, refer to the example in the foregoing Table 5; or the foregoing Table 5 is defined in a protocol;

configuration information of one or more sensing signals or reference signals, where the configuration information includes time resource information, frequency resource information, a CDM type (including a CDM value and a mode), resource mapping (that is, an orthogonal frequency division multiplexing symbol and subcarrier occupancy information of a resource in a slot), a density, port information, and the like; and a terminal group rule, or a terminal group index ID and an associated terminal ID characteristic, and a terminal ID (which may also be referred to as a sensing terminal ID), where the terminal ID may be, for example, a terminal core network identifier such as a 5G-GUTI, a 5G-S-TMSI, a 5G-TMSI, or an SUCI, or may be a terminal radio access network identifier such as an I-RNTI or an RAN UE NGAP ID.

The terminal receives the PEI sent by the network side device, where a bit in the PEI and a corresponding terminal behavior are shown in Table 3. Specifically, if the terminal detects the PEI, the terminal behavior is selected according to an indication of two bits in the PEI, which is specifically as follows:

If the terminal detects that a sensing-associated bit in the PEI is 00, the terminal does not need to detect a paging PDCCH.

If the terminal detects that a sensing-associated bit in the PEI is 01, the terminal needs to detect a paging PDCCH.

If the terminal detects that a sensing-associated bit in the PEI is 10, the terminal behavior is as follows:

The terminal needs to detect a paging PDCCH, and send a sensing signal or a reference signal according to an indication of the paging PDCCH; or the terminal needs to monitor a sensing dedicated PDCCH, and send a sensing signal or a reference signal according to an indication of the sensing dedicated PDCCH; or the terminal needs to monitor a sensing dedicated PDCCH, demodulate a corresponding PDSCH according to the sensing dedicated PDCCH, and if a terminal ID in the PDSCH or an ID of a group in which the terminal is located is associated with the terminal, send a sensing signal or a reference signal according to an indication of the sensing dedicated PDCCH/PDSCH.

If the terminal detects that a sensing-associated bit in the PEI is 11, the terminal behavior is as follows:

The terminal needs to monitor a paging PDCCH, and send a sensing signal or a reference signal according to an indication of the paging PDCCH; or the terminal needs to monitor a paging PDCCH and a sensing dedicated PDCCH, and send a sensing signal or a reference signal according to an indication of the sensing dedicated PDCCH; or the terminal needs to monitor a paging PDCCH and a sensing dedicated PDCCH, demodulate a corresponding PDSCH according to the sensing dedicated PDCCH, and if a terminal ID in the PDSCH or an ID of a group in which the terminal is located is associated with the terminal, send a sensing signal or a reference signal according to an indication of the sensing dedicated PDCCH/PDSCH.

Indication content of the paging PDCCH/sensing dedicated PDCCH/PDSCH includes at least one of the following:

a sensing signal or a reference signal that needs to be sent by the terminal, where the sensing signal or the reference signal includes at least one of the following: a preamble, an SRS, a DMRS, or a PTRS of an RACH; or a sensing dedicated signal, where the sensing dedicated signal may be a 6G or 5G-evolved sensing dedicated signal;

a time resource, a frequency resource, and the like for sending the sensing signal or the reference signal by the terminal;

a terminal ID or a terminal group ID of the sensing signal or the reference signal that needs to be sent; and a sending manner of the sensing signal or the reference signal.

The sending manner includes at least one of the following:

Manner 1: The terminal sends the sensing signal or the reference signal in four-step random access. For example, a preamble is sent for sensing, or a DMRS of a MSG 3 is sent for sensing.

Manner 2: The terminal sends the sensing signal or the reference signal in two-step random access. For example, a preamble of a MSG A is sent for sensing, or a DMRS of a MSG A is sent for sensing.

Manner 3: The sensing signal or the reference signal is sent in an SDT process.

Manner 4: The terminal initiates random access, and sends the sensing signal or the reference signal after entering a connected state.

Embodiment 6

In this embodiment, a hierarchical indication is adopted. Specifically, a broadcast message, a PEI that supports terminal grouping, and a paging PDCCH/sensing dedicated PDCCH are used to indicate a terminal to send an uplink sensing signal. The following is specifically included:

A terminal receives one or more pieces of broadcast signaling such as SIB, or RRC signaling sent by a network side device, where the one or more pieces of broadcast signaling or RRC signaling indicate at least one of the following:

numbers (or indexes) of one or more uplink sensing signals or reference signals, where for details, refer to the example in the foregoing Table 5; or the foregoing Table 5 is defined in a protocol;

configuration information of one or more sensing signals or reference signals, where the configuration information includes time resource information, frequency resource information, a CDM type (including a CDM value and a mode), resource mapping (that is, an orthogonal frequency division multiplexing symbol and subcarrier occupancy information of a resource in a slot), a density, port information, and the like; and a terminal group rule, or a terminal group index ID and an associated terminal ID characteristic, and a terminal ID (which may also be referred to as a sensing terminal ID), where the terminal ID may be, for example, a terminal core network identifier such as a 5G-GUTI, a 5G-S-TMSI, a 5G-TMSI, or an SUCI, or may be a terminal radio access network identifier such as an I-RNTI or an RAN UE NGAP ID.

The terminal receives the PEI sent by the network side device, where a bit in the PEI and a corresponding terminal behavior are shown in the foregoing Table 3, which is specifically as follows:

If the terminal detects the PEI, the terminal behavior is selected according to an indication of two bits in the PEI.

If the terminal detects that a bit associated with the group in which the terminal is located in the PEI is 00, the terminal does not need to detect Paging PDCCH.

If the terminal detects that the bit associated with a group in which the terminal is located in the PEI is 01, the terminal needs to detect a paging PDCCH.

If the terminal detects that a bit associated with a group in which the terminal is located in the PEI is 10, the terminal behavior is as follows:

The terminal needs to detect a paging PDCCH, and send a sensing signal or a reference signal according to an indication of the paging PDCCH; or the terminal needs to monitor a sensing dedicated PDCCH, and send a sensing signal or a reference signal according to an indication of the sensing dedicated PDCCH; or the terminal needs to monitor a sensing dedicated PDCCH, demodulate a corresponding PDSCH according to the sensing dedicated PDCCH, and if a terminal ID in the PDSCH or an ID of a group in which the terminal is located is associated with the terminal, send a sensing signal or a reference signal according to an indication of the sensing dedicated PDCCH/PDSCH.

If the terminal detects that a bit associated with a group in which the terminal is located in the PEI is 11, the terminal behavior is as follows:

The terminal needs to monitor a paging PDCCH, and send a sensing signal or a reference signal according to an indication of the paging PDCCH; or the terminal needs to monitor a paging PDCCH and a sensing dedicated PDCCH, and send a sensing signal or a reference signal according to an indication of the sensing dedicated PDCCH; or the terminal needs to monitor a paging PDCCH and a sensing dedicated PDCCH, demodulate a corresponding PDSCH according to the sensing dedicated PDCCH, and if a terminal ID in the PDSCH or an ID of a group in which the terminal is located is associated with the terminal, send a sensing signal or a reference signal according to an indication of the sensing dedicated PDCCH/PDSCH.

Indication content of the paging PDCCH/sensing dedicated PDCCH/PDSCH includes at least one of the following:

a sensing signal or a reference signal that needs to be sent by the terminal, where the sensing signal or the reference signal includes at least one of the following: a preamble, an SRS, a DMRS, or a PTRS of an RACH; or a sensing dedicated signal, where the sensing dedicated signal may be a 6G or 5G-evolved sensing dedicated signal;

a time resource, a frequency resource, and the like for sending the sensing signal or the reference signal by the terminal;

a terminal ID or a terminal group ID of the sensing signal or the reference signal that needs to be sent; and a sending manner of the sensing signal or the reference signal.

The sending manner includes at least one of the following:

The sending manner includes at least one of the following:

Manner 1: The terminal sends the sensing signal or the reference signal in four-step random access. For example, a preamble is sent for sensing, or a DMRS of a MSG 3 is sent for sensing.

Manner 2: The terminal sends the sensing signal or the reference signal in two-step random access. For example, a preamble of a MSG A is sent for sensing, or a DMRS of a MSG A is sent for sensing.

Manner 3: The sensing signal or the reference signal is sent in an SDT process.

Manner 4: The terminal initiates random access, and sends the sensing signal or the reference signal after entering a connected state.

In this embodiment of this application, the PEI may indicate sensing-related behaviors of the terminal in an idle state and an inactive state, thereby improving sensing performance of the terminal in an idle state and an inactive state.

The sensing measurement method provided in the embodiments of this application may be performed by a sensing measurement apparatus. In the embodiments of this application, an example in which the sensing measurement apparatus performs the sensing measurement method is used to describe the sensing measurement apparatus provided in the embodiments of this application.

Figure 7:
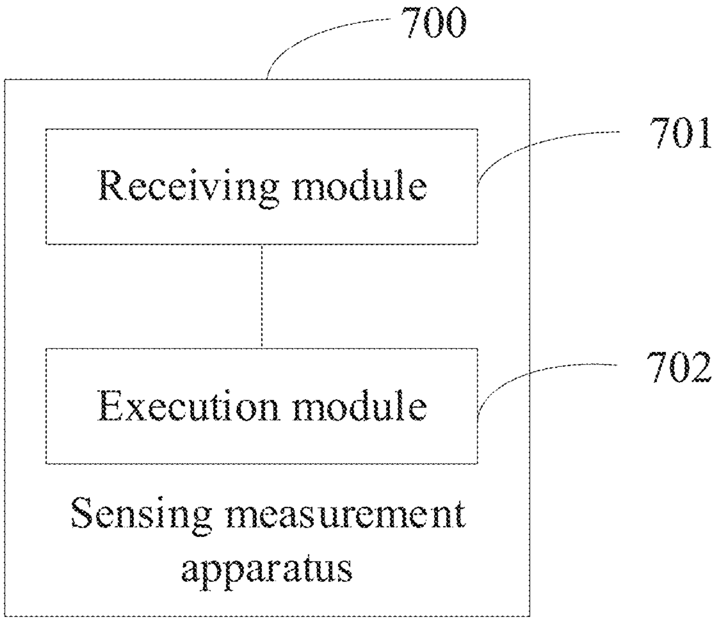
FIG. 7 is a structural diagram of a communication device according to an embodiment of this application.

Referring to FIG. 7, FIG. 7 is a structural diagram of a sensing measurement apparatus according to an embodiment of this application. As shown in FIG. 7, the apparatus includes:

a receiving module 701, configured to receive a paging early indication PEI, where the PEI includes sensing indication information; and an execution module 702, configured to perform a target operation according to the sensing indication information, where the target operation includes at least one of the following:

performing sensing measurement on a first signal, and reporting a sensing measurement quantity; and sending, to a target device, a second signal used by the target device to perform sensing measurement.

Optionally, the sensing indication information includes at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, and terminal identifier information for sending the second signal.

Optionally, the sensing indication information is used to indicate one of the following:

indicating not to detect a paging physical downlink control channel PDCCH;

indicating to detect a paging PDCCH;

indicating to detect a sensing dedicated PDCCH; and indicating to detect a paging PDCCH and a sensing dedicated PDCCH.

Optionally, the execution module 702 is configured to perform at least one of the following:

in a case that the sensing indication information indicates to detect a paging PDCCH, detecting, by the terminal, a paging PDCCH, and performing the target operation according to indication content of the detected paging PDCCH;

in a case that the sensing indication information indicates to detect a sensing dedicated PDCCH, detecting, by the terminal, a sensing dedicated PDCCH, and performing the target operation according to indication content of the detected sensing dedicated PDCCH;

in a case that the sensing indication information indicates to detect a sensing dedicated PDCCH, detecting, by the terminal, a sensing dedicated PDCCH, and demodulating a physical downlink shared channel PDSCH according to the detected sensing dedicated PDCCH, and if a terminal identifier in the PDSCH is associated with the terminal, performing the target operation according to indication content of the dedicated PDCCH or the PDSCH;

in a case that the sensing indication information indicates to detect a paging PDCCH and a sensing dedicated PDCCH, detecting, by the terminal, a sensing dedicated PDCCH and a paging PDCCH, and performing the target operation according to indication content of the detected sensing dedicated PDCCH; and in a case that the sensing indication information indicates to detect a paging PDCCH and a sensing dedicated PDCCH, detecting, by the terminal, a sensing dedicated PDCCH and a paging PDCCH, demodulating a PDSCH according to the detected sensing dedicated PDCCH, and if a terminal identifier in the PDSCH is associated with the terminal, performing the target operation according to indication content of the dedicated PDCCH or the PDSCH.

Optionally, the indication content of the dedicated PDCCH, the indication content of the PDSCH, or the indication content of the paging PDCCH includes at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, and terminal identifier information for sending the second signal.

Optionally, the indication information of the first signal includes at least one of the following:

identifier information of the first signal, a detection cycle of the first signal, a detection offset of the first signal, and terminal identifier information corresponding to the first signal.

Optionally, the information about the sensing measurement quantity includes at least one of the following:

a channel matrix, channel state information, a reference signal received power, a received signal strength indicator, a channel power delay spectrum, a Doppler power spectrum, a Doppler spread, a coherence bandwidth, a coherence time, a power of each path in a multipath channel, a delay of each path in the multipath channel, an angle of each path in the multipath channel, a Doppler frequency shift, a quotient of frequency domain channel responses of a first antenna and a second antenna, a conjugate multiplier of the frequency domain channel responses of the first antenna and the second antenna, an amplitude ratio of received signals of the first antenna and the second antenna, an amplitude difference between the received signals of the first antenna and the second antenna, a phase difference between the first antenna and the second antenna, and angle-related information of the first antenna and the second antenna, where the first antenna and the second antenna are receive antennas of the terminal.

Optionally, the information about the sensing measurement quantity further includes granularity information of the sensing measurement quantity.

Optionally, the reporting manner of the sensing measurement quantity includes one of the following:

initiating a short data transfer SDT procedure to report the sensing measurement quantity; and initiating random access to report the sensing measurement quantity.

Optionally, the sending manner of the second signal includes one of the following: sending the second signal in a four-step random access process;

sending the second signal in a two-step random access process;

initiating an SDT procedure to send the second signal; and initiating random access to send the second signal.

Optionally, the sensing indication information is carried in a sensing-associated bit carried in the PEI; or the sensing indication information is carried in a sensing indication bit that is in at least one group of sensing indication bits carried in the PEI and that is associated with a terminal group in which the terminal is located.

Optionally, the apparatus further includes:

a receiving module, configured to receive configuration signaling, where the configuration signaling is used to indicate sensing configuration information; and the execution module 702 is configured to perform the target operation according to the sensing indication information and the sensing configuration information.

Optionally, the execution module 702 is configured to perform the target operation according to target information, where the target information includes information indicated by the sensing indication information in the sensing configuration information.

Optionally, the sensing configuration information includes at least one of the following:

identifier information of at least one type of signal used for sensing measurement, configuration information of at least one type of signal used for sensing measurement, at least one type of information about the sensing measurement quantity, at least one type of resource information for reporting the sensing measurement quantity, and terminal identifier information.

Optionally, the terminal identifier information includes at least one of the following:

a terminal group rule, a terminal group identifier, and a terminal identifier.

Optionally, the first signal includes at least one of the following:

a sensing signal, a reference signal, and a synchronization signal; and/or the second signal includes at least one of the following:

a sensing signal, a reference signal, and a synchronization signal.

Optionally, the reference signal included in the first signal includes at least one of the following:

a channel state information-reference signal CSI-RS, a positioning reference signal PRS, a demodulation reference signal DMRS, a phase tracking reference signal PTRS, and a tracking reference signal TRS; and/or the reference signal included in the second signal includes at least one of the following:

a preamble, an SRS, a DMRS, and a PTRS.

The foregoing sensing measurement apparatus can improve sensing performance of the terminal.

The sensing measurement apparatus in this embodiment of this application may be an electronic device, for example, an electronic device with an operating system, or may be a component in the electronic device, for example, an integrated circuit or a chip. The electronic device may be a terminal, or another device other than the terminal. For example, the terminal may include but is not limited to the foregoing listed types of the terminal in the embodiments of this application. The another device may be a server, a network attached storage (NAS), or the like. This embodiment of this application sets no specific limitation thereto.

The sensing measurement apparatus provided in this embodiment of this application can implement the processes implemented in the method embodiment shown in FIG. 5, and achieve a same technical effect. To avoid repetition, details are not described herein again.

The sensing measurement indication method provided in the embodiments of this application may be performed by a sensing measurement indication apparatus. In the embodiments of this application, an example in which the sensing measurement indication apparatus performs the sensing measurement indication method is used to describe the sensing measurement indication apparatus provided in the embodiments of this application.

Figure 8:
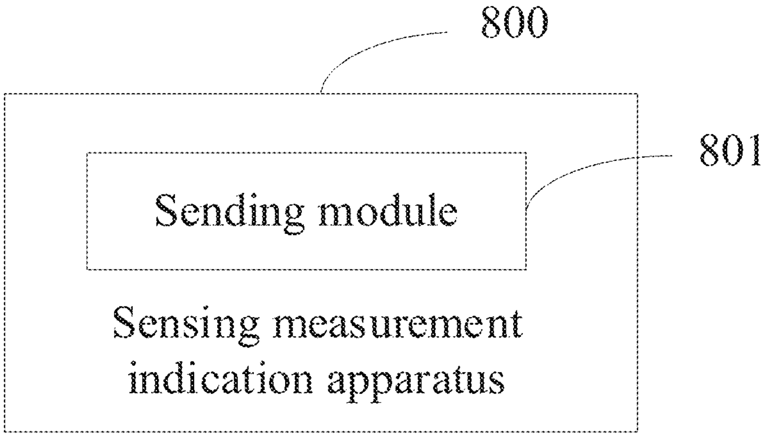
FIG. 8 is a structural diagram of a sensing measurement apparatus according to an embodiment of this application.

Referring to FIG. 8, FIG. 8 is a structural diagram of a sensing measurement indication apparatus according to an embodiment of this application. As shown in FIG. 8, the apparatus includes:

a sending module 801, configured to send a paging early indication PEI to a terminal, where the PEI includes sensing indication information, the sensing indication information is used by the terminal to perform a target operation, and the target operation includes at least one of the following:

performing sensing measurement on a first signal, and reporting a sensing measurement quantity; and sending, to a target device, a second signal used by the target device to perform sensing measurement.

Optionally, the apparatus further includes at least one of the following:

a signal sending module, configured to send the first signal to the terminal;

a receiving module, configured to receive the sensing measurement quantity reported by the terminal; and a measurement module, configured to perform sensing measurement on the second signal sent by the terminal.

Optionally, the sensing indication information includes at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, and terminal identifier information for sending the second signal.

Optionally, the sensing indication information is used to indicate one of the following:

indicating not to detect a paging physical downlink control channel PDCCH;

indicating not to detect a paging physical downlink control channel PDCCH;

indicating to detect a paging PDCCH;

indicating to detect a sensing dedicated PDCCH; and indicating to detect a paging PDCCH and a sensing dedicated PDCCH.

Optionally, in a case that the sensing indication information indicates to detect a paging PDCCH, indication content of the paging PDCCH is used by the terminal to perform the target operation;

in a case that the sensing indication information indicates to detect a sensing dedicated PDCCH, indication content of the sensing dedicated PDCCH is used by the terminal to perform the target operation;

in a case that the sensing indication information indicates to detect a sensing dedicated PDCCH, the sensing dedicated PDCCH is used by the terminal to demodulate a physical downlink shared channel PDSCH, and if a terminal identifier in the PDSCH is associated with the terminal, indication content of the dedicated PDCCH or the PDSCH is used by the terminal to perform the target operation;

in a case that the sensing indication information indicates to detect a paging PDCCH and a sensing dedicated PDCCH, indication content of the sensing dedicated PDCCH is used by the terminal to perform the target operation; and in a case that the sensing indication information indicates to detect a paging PDCCH and a sensing dedicated PDCCH, the sensing dedicated PDCCH is used by the terminal to demodulate a PDSCH, and if a terminal identifier in the PDSCH is associated with the terminal, indication content of the dedicated PDCCH or the PDSCH is used by the terminal to perform the target operation.

Optionally, the indication content of the dedicated PDCCH, the indication content of the PDSCH, or the indication content of the paging PDCCH includes at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, and terminal identifier information for sending the second signal.

Optionally, the indication information of the first signal includes at least one of the following:

identifier information of the first signal, a detection cycle of the first signal, a detection offset of the first signal, and terminal identifier information corresponding to the first signal.

Optionally, the information about the sensing measurement quantity includes at least one of the following:

a channel matrix, channel state information, a reference signal received power, a received signal strength indicator, a channel power delay spectrum, a Doppler power spectrum, a Doppler spread, a coherence bandwidth, a coherence time, a power of each path in a multipath channel, a delay of each path in the multipath channel, an angle of each path in the multipath channel, a Doppler frequency shift, a quotient of frequency domain channel responses of a first antenna and a second antenna, a conjugate multiplier of the frequency domain channel responses of the first antenna and the second antenna, an amplitude ratio of received signals of the first antenna and the second antenna, an amplitude difference between the received signals of the first antenna and the second antenna, a phase difference between the first antenna and the second antenna, and angle-related information of the first antenna and the second antenna, where the first antenna and the second antenna are receive antennas of the terminal.

Optionally, the information about the sensing measurement quantity further includes granularity information of the sensing measurement quantity.

Optionally, the reporting manner of the sensing measurement quantity includes one of the following:

initiating a short data transfer SDT procedure to report the sensing measurement quantity; and initiating random access to report the sensing measurement quantity.

Optionally, the sending manner of the second signal includes one of the following:

sending the second signal in a four-step random access process;

sending the second signal in a two-step random access process;

initiating an SDT procedure to send the second signal; and initiating random access to send the second signal.

Optionally, the sensing indication information is carried in a sensing-associated bit carried in the PEI; or the sensing indication information is carried in a sensing indication bit that is in at least one group of sensing indication bits carried in the PEI and that is associated with a terminal group in which the terminal is located.

Optionally, the apparatus further includes:

a signaling sending module, configured to send configuration signaling to the terminal, where the configuration signaling is used to indicate sensing configuration information.

Optionally, the sensing configuration information includes at least one of the following:

identifier information of at least one type of signal used for sensing measurement, configuration information of at least one type of signal used for sensing measurement, at least one type of information about the sensing measurement quantity, at least one type of resource information for reporting the sensing measurement quantity, and terminal identifier information.

Optionally, the terminal identifier information includes at least one of the following:

a terminal group rule, a terminal group identifier, and a terminal identifier.

Optionally, the first signal includes at least one of the following:

a sensing signal, a reference signal, and a synchronization signal; and/or the second signal includes at least one of the following:

a sensing signal, a reference signal, and a synchronization signal.

Optionally, the reference signal included in the first signal includes at least one of the following:

a channel state information-reference signal CSI-RS, a positioning reference signal PRS, a demodulation reference signal DMRS, a phase tracking reference signal PTRS, and a tracking reference signal TRS; and/or the reference signal included in the second signal includes at least one of the following:

a preamble, an SRS, a DMRS, and a PTRS.

The foregoing sensing measurement indication apparatus can improve sensing performance of the terminal.

The sensing measurement apparatus in this embodiment of this application may be an electronic device, for example, an electronic device with an operating system, or may be a component in the electronic device, for example, an integrated circuit or a chip. The electronic device may be a network side device, or may be another device other than the terminal. For example, the network side device may include but is not limited to the foregoing listed types of the network side device in the embodiments of this application. The another device may be a server, a network attached storage (NAS), or the like. This embodiment of this application sets no specific limitation thereto.

The sensing measurement apparatus provided in this embodiment of this application can implement the processes implemented in the method embodiment shown in FIG. 6, and achieve a same technical effect. To avoid repetition, details are not described herein again.

Figure 9:
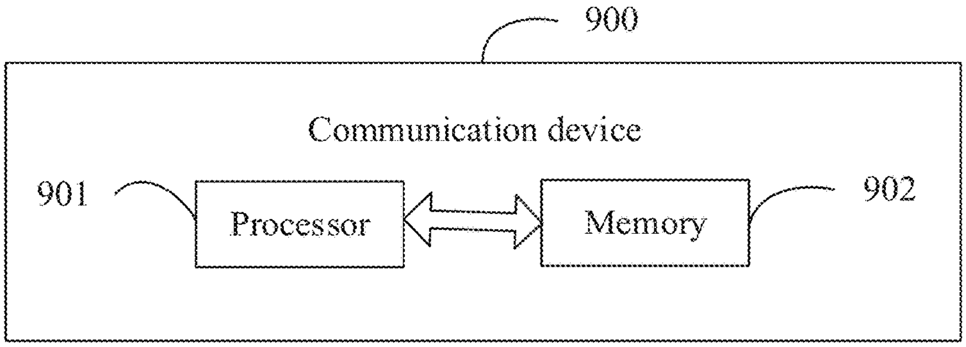
FIG. 9 is a structural diagram of a sensing measurement indication apparatus according to an embodiment of this application.

Optionally, as shown in FIG. 9, an embodiment of this application further provides a communication device 900, including a processor 901 and a memory 902. The memory 902 stores a program or an instruction that can be run on the processor 901. For example, when the communication device 900 is a terminal, the program or the instruction is executed by the processor 901 to implement the steps of the foregoing sensing measurement method or sensing measurement indication method embodiment, and a same technical effect can be achieved. When the communication device 900 is a network side device, the program or the instruction is executed by the processor 901 to implement the steps of the foregoing sensing measurement method or sensing measurement indication method embodiment, and a same technical effect can be achieved. To avoid repetition, details are not described herein again.

Figure 10:
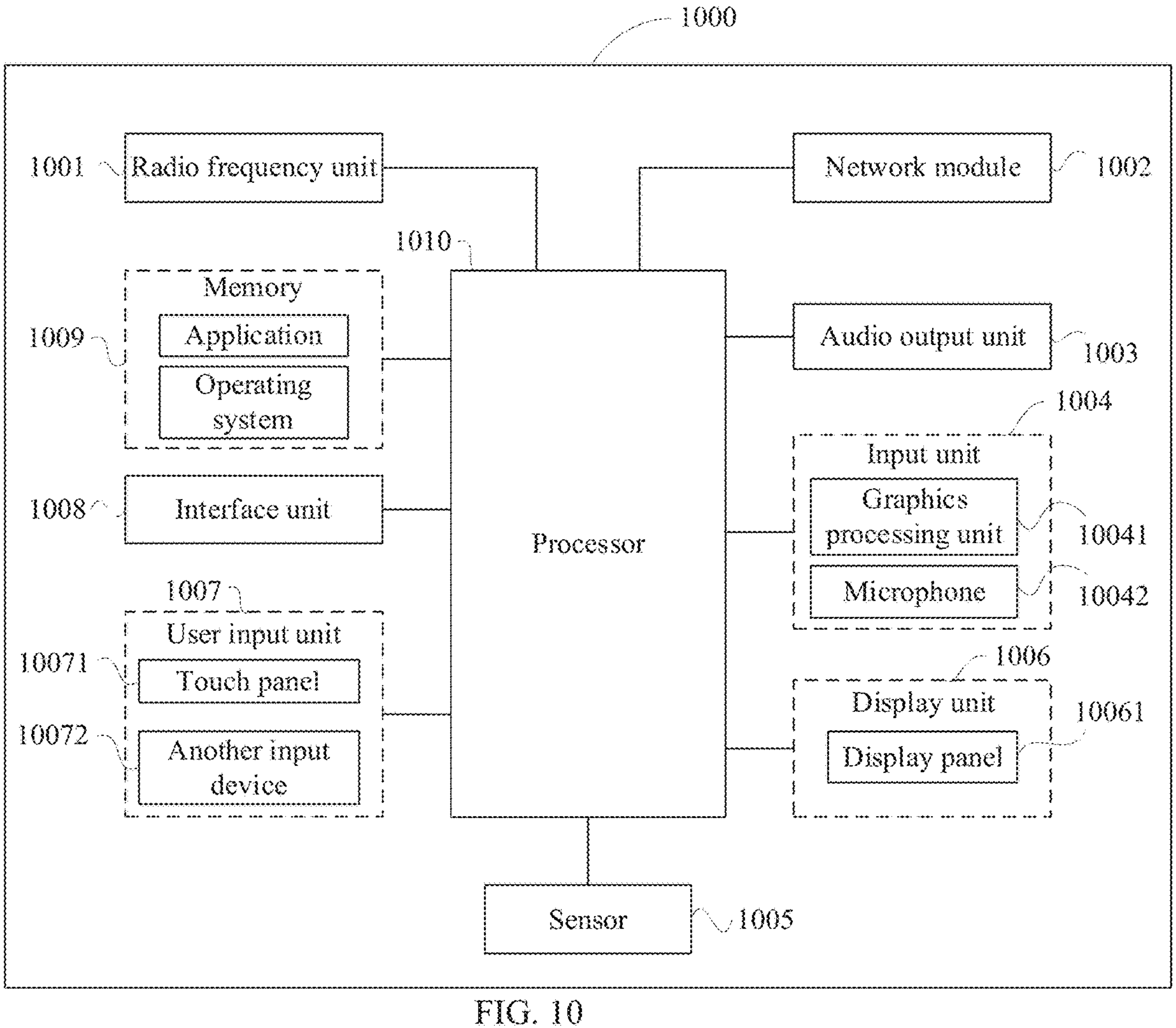
FIG. 10 is a structural diagram of a terminal according to an embodiment of this application.

An embodiment of this application further provides a terminal, including a processor and a communication interface. The communication interface is configured to receive a paging early indication PEI, where the PEI includes sensing indication information; and perform a target operation according to the sensing indication information, where the target operation includes at least one of the following: performing sensing measurement on a first signal, and reporting a sensing measurement quantity; and sending, to a target device, a second signal used by the target device to perform sensing measurement. This terminal embodiment corresponds to the foregoing method embodiment on the terminal side. Each implementation process and implementation of the foregoing method embodiment may be applicable to this terminal embodiment, and a same technical effect can be achieved. Specifically, FIG. 10 is a schematic diagram of a hardware structure of a terminal according to an embodiment of this application.

A terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the terminal 1000 may further include the power supply (for example, a battery) that supplies power to each component. The power supply may be logically connected to the processor 1010 by using a power supply management system, so as to manage functions such as charging, discharging, and power consumption by using the power supply management system. The terminal structure shown in FIG. 10 constitutes no limitation on the terminal, and the terminal may include more or fewer components than those shown in the figure, or combine some components, or have different component arrangements. Details are not described herein.

It should be understood that, in this embodiment of this application, the input unit 1004 may include a graphics processing unit (GPU) 10041 and a microphone 10042, and the graphics processing unit 10041 processes image data of a still image or a video that is obtained by an image capturing apparatus (for example, a camera) in a video capturing mode or an image capturing mode. The display unit 1006 may include a display panel 10061. The display panel 10061 may be configured in a form such as a liquid crystal display or an organic light-emitting diode. The user input unit 1007 includes at least one of a touch panel 10071 and another input device 10072. The touch panel 10071 is also referred to as a touchscreen. The touch panel 10071 may include two parts: a touch detection apparatus and a touch controller. The another input device 10072 may include but is not limited to a physical keyboard, a functional button (such as a volume control button or a power on/off button), a trackball, a mouse, and a joystick. Details are not described herein.

In this embodiment of this application, after receiving downlink data from a network side device, the radio frequency unit 1001 may transmit the downlink data to the processor 1010 for processing. In addition, the radio frequency unit 1001 may send uplink data to the network side device. Usually, the radio frequency unit 1001 includes but is not limited to an antenna, an amplifier, a transceiver, a coupler, a low noise amplifier, a duplexer, and the like.

The memory 1009 may be configured to store a software program or an instruction and various data. The memory 1009 may mainly include a first storage area for storing a program or an instruction and a second storage area for storing data. The first storage area may store an operating system, and an application or an instruction required by at least one function (for example, a sound playing function or an image playing function). In addition, the memory 1009 may be a volatile memory or a nonvolatile memory, or the memory 1009 may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 1009 in this embodiment of this application includes but is not limited to these memories and a memory of any other proper type.

The processor 1010 may include one or more processing units. Optionally, an application processor and a modem processor are integrated into the processor 1010. The application processor mainly processes an operating system, a user interface, an application, and the like. The modem processor mainly processes a wireless communication signal, for example, a baseband processor. It can be understood that, alternatively, the modem processor may not be integrated into the processor 1010.

The radio frequency unit 1001 is configured to receive a paging early indication PEI, where the PEI includes sensing indication information; and perform a target operation according to the sensing indication information, where the target operation includes at least one of the following:

performing sensing measurement on a first signal, and reporting a sensing measurement quantity; and sending, to a target device, a second signal used by the target device to perform sensing measurement.

Optionally, the sensing indication information includes at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, and terminal identifier information for sending the second signal.

Optionally, the sensing indication information is used to indicate one of the following:

indicating not to detect a paging physical downlink control channel PDCCH;

indicating to detect a paging PDCCH;

indicating to detect a sensing dedicated PDCCH; and indicating to detect a paging PDCCH and a sensing dedicated PDCCH.

Optionally, the performing a target operation according to the sensing indication information includes at least one of the following:

in a case that the sensing indication information indicates to detect a paging PDCCH, detecting a paging PDCCH, and performing the target operation according to indication content of the detected paging PDCCH;

in a case that the sensing indication information indicates to detect a sensing dedicated PDCCH, detecting a sensing dedicated PDCCH, and performing the target operation according to indication content of the detected sensing dedicated PDCCH;

in a case that the sensing indication information indicates to detect a sensing dedicated PDCCH, detecting a sensing dedicated PDCCH, and demodulating a physical downlink shared channel PDSCH according to the detected sensing dedicated PDCCH, and if a terminal identifier in the PDSCH is associated with the terminal, performing the target operation according to indication content of the dedicated PDCCH or the PDSCH;

in a case that the sensing indication information indicates to detect a paging PDCCH and a sensing dedicated PDCCH, detecting a sensing dedicated PDCCH and a paging PDCCH, and performing the target operation according to indication content of the detected sensing dedicated PDCCH; and in a case that the sensing indication information indicates to detect a paging PDCCH and a sensing dedicated PDCCH, detecting a sensing dedicated PDCCH and a paging PDCCH, demodulating a PDSCH according to the detected sensing dedicated PDCCH, and if a terminal identifier in the PDSCH is associated with the terminal, performing the target operation according to indication content of the dedicated PDCCH or the PDSCH.

Optionally, the indication content of the dedicated PDCCH, the indication content of the PDSCH, or the indication content of the paging PDCCH includes at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, and terminal identifier information for sending the second signal.

Optionally, the indication information of the first signal includes at least one of the following:

identifier information of the first signal, a detection cycle of the first signal, a detection offset of the first signal, and terminal identifier information corresponding to the first signal.

Optionally, the information about the sensing measurement quantity includes at least one of the following:

a channel matrix, channel state information, a reference signal received power, a received signal strength indicator, a channel power delay spectrum, a Doppler power spectrum, a Doppler spread, a coherence bandwidth, a coherence time, a power of each path in a multipath channel, a delay of each path in the multipath channel, an angle of each path in the multipath channel, a Doppler frequency shift, a quotient of frequency domain channel responses of a first antenna and a second antenna, a conjugate multiplier of the frequency domain channel responses of the first antenna and the second antenna, an amplitude ratio of received signals of the first antenna and the second antenna, an amplitude difference between the received signals of the first antenna and the second antenna, a phase difference between the first antenna and the second antenna, and angle-related information of the first antenna and the second antenna, where the first antenna and the second antenna are receive antennas of the terminal.

Optionally, the information about the sensing measurement quantity further includes granularity information of the sensing measurement quantity.

Optionally, the reporting manner of the sensing measurement quantity includes one of the following:

initiating a short data transfer SDT procedure to report the sensing measurement quantity; and initiating random access to report the sensing measurement quantity.

Optionally, the sending manner of the second signal includes one of the following: sending the second signal in a two-step random access process;

initiating an SDT procedure to send the second signal; and initiating random access to send the second signal.

Optionally, the sensing indication information is carried in a sensing-associated bit carried in the PEI; or the sensing indication information is carried in a sensing indication bit that is in at least one group of sensing indication bits carried in the PEI and that is associated with a terminal group in which the terminal is located.

Optionally, the radio frequency unit 1001 is further configured to:

receive configuration signaling, where the configuration signaling is used to indicate sensing configuration information; and the performing a target operation according to the sensing indication information includes:

performing the target operation according to the sensing indication information and the sensing configuration information.

Optionally, the performing the target operation according to the sensing indication information and the sensing configuration information includes:

performing the target operation according to target information, where the target information includes information indicated by the sensing indication information in the sensing configuration information.

Optionally, the sensing configuration information includes at least one of the following:

identifier information of at least one type of signal used for sensing measurement, configuration information of at least one type of signal used for sensing measurement, at least one type of information about the sensing measurement quantity, at least one type of resource information for reporting the sensing measurement quantity, and terminal identifier information.

Optionally, the terminal identifier information includes at least one of the following:

a terminal group rule, a terminal group identifier, and a terminal identifier.

Optionally, the first signal includes at least one of the following:

a sensing signal, a reference signal, and a synchronization signal; and/or the second signal includes at least one of the following:

a sensing signal, a reference signal, and a synchronization signal.

Optionally, the reference signal included in the first signal includes at least one of the following:

a channel state information-reference signal CSI-RS, a positioning reference signal PRS, a demodulation reference signal DMRS, a phase tracking reference signal PTRS, and a tracking reference signal TRS; and/or the reference signal included in the second signal includes at least one of the following:

a preamble, an SRS, a DMRS, and a PTRS.

The foregoing terminal can improve sensing performance of the terminal.

An embodiment of this application further provides a network side device, including a processor and a communication interface. The communication interface is configured to: send a paging early indication PEI to a terminal, where the PEI includes sensing indication information, the sensing indication information is used by the terminal to perform a target operation, and the target operation includes at least one of the following: performing sensing measurement on a first signal, and reporting a sensing measurement quantity; and sending, to a target device, a second signal used by the target device to perform sensing measurement. The network side device embodiment corresponds to the foregoing method embodiment of the network side device. Each implementation process and implementation of the foregoing method embodiment may be applicable to the network side device embodiment, and a same technical effect can be achieved.

Figure 11:
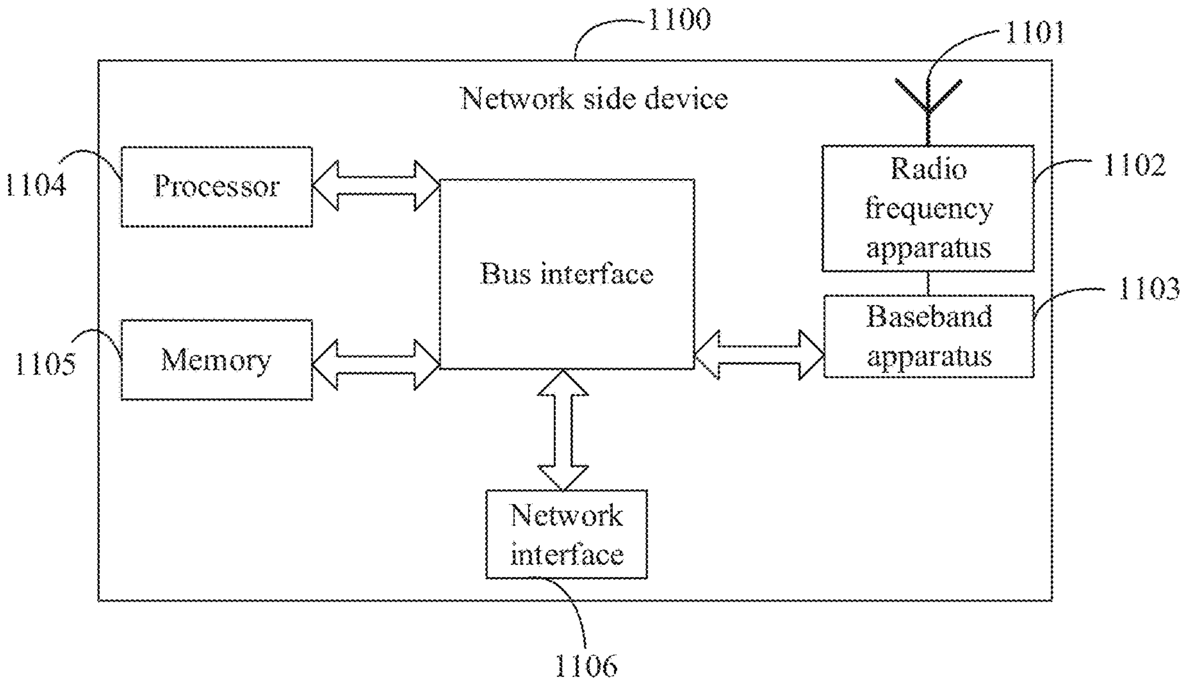
FIG. 11 is a structural diagram of a network side device according to an embodiment of this application.

Specifically, an embodiment of this application further provides a network side device. As shown in FIG. 11, the network side device 11000 includes an antenna 1101, a radio frequency apparatus 1102, a baseband apparatus 1103, a processor 1104, and a memory 1105. The antenna 1101 is connected to the radio frequency apparatus 1102. In an uplink direction, the radio frequency apparatus 1102 receives information by using the antenna 1101, and sends the received information to the baseband apparatus 1103 for processing. In a downlink direction, the baseband apparatus 1103 processes information that needs to be sent, and sends processed information to the radio frequency apparatus 1102. The radio frequency apparatus 1102 processes the received information, and sends processed information by using the antenna 1101.

In the foregoing embodiment, the method performed by the network side device may be implemented in a baseband apparatus 1103. The baseband apparatus 1103 includes a baseband processor.

For example, the baseband apparatus 1103 may include at least one baseband board. A plurality of chips are disposed on the baseband board. As shown in FIG. 11, one chip is, for example, a baseband processor, and is connected to the memory 1105 by using a bus interface, to invoke a program in the memory 1105 to perform the operations of the network device shown in the foregoing method embodiment.

The network side device may further include a network interface 1106, and the interface is, for example, a common public radio interface (CPRI).

Specifically, the network side device 11000 in this embodiment of the present invention further includes an instruction or a program that is stored in the memory 1105 and that can be run on the processor 1104. The processor 1104 invokes the instruction or the program in the memory 1105 to perform the method performed by the modules shown in FIG. 6, and a same technical effect is achieved. To avoid repetition, details are not described herein again.

The radio frequency apparatus 1102 is configured to send a paging early indication PEI to a terminal, where the PEI includes sensing indication information, the sensing indication information is used by the terminal to perform a target operation, and the target operation includes at least one of the following:

performing sensing measurement on a first signal, and reporting a sensing measurement quantity; and sending, to a target device, a second signal used by the target device to perform sensing measurement.

Optionally, the radio frequency apparatus 1102 is further configured to perform at least one of the following:

sending the first signal to the terminal;

receiving the sensing measurement quantity reported by the terminal; and performing sensing measurement on the second signal sent by the terminal.

Optionally, the sensing indication information includes at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, and terminal identifier information for sending the second signal.

Optionally, the sensing indication information is used to indicate one of the following:

indicating not to detect a paging physical downlink control channel PDCCH;

indicating to detect a paging PDCCH;

indicating to detect a sensing dedicated PDCCH; and indicating to detect a paging PDCCH and a sensing dedicated PDCCH.

Optionally, in a case that the sensing indication information indicates to detect a paging PDCCH, indication content of the paging PDCCH is used by the terminal to perform the target operation;

in a case that the sensing indication information indicates to detect a sensing dedicated PDCCH, indication content of the sensing dedicated PDCCH is used by the terminal to perform the target operation;

in a case that the sensing indication information indicates to detect a sensing dedicated PDCCH, the sensing dedicated PDCCH is used by the terminal to demodulate a physical downlink shared channel PDSCH, and if a terminal identifier in the PDSCH is associated with the terminal, indication content of the dedicated PDCCH or the PDSCH is used by the terminal to perform the target operation;

in a case that the sensing indication information indicates to detect a paging PDCCH and a sensing dedicated PDCCH, indication content of the sensing dedicated PDCCH is used by the terminal to perform the target operation; and in a case that the sensing indication information indicates to detect a paging PDCCH and a sensing dedicated PDCCH, the sensing dedicated PDCCH is used by the terminal to demodulate a PDSCH, and if a terminal identifier in the PDSCH is associated with the terminal, indication content of the dedicated PDCCH or the PDSCH is used by the terminal to perform the target operation.

Optionally, the indication content of the dedicated PDCCH, the indication content of the PDSCH, or the indication content of the paging PDCCH includes at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, and terminal identifier information for sending the second signal.

Optionally, the indication information of the first signal includes at least one of the following:

identifier information of the first signal, a detection cycle of the first signal, a detection offset of the first signal, and terminal identifier information corresponding to the first signal.

Optionally, the information about the sensing measurement quantity includes at least one of the following:

a channel matrix, channel state information, a reference signal received power, a received signal strength indicator, a channel power delay spectrum, a Doppler power spectrum, a Doppler spread, a coherence bandwidth, a coherence time, a power of each path in a multipath channel, a delay of each path in the multipath channel, an angle of each path in the multipath channel, a Doppler frequency shift, a quotient of frequency domain channel responses of a first antenna and a second antenna, a conjugate multiplier of the frequency domain channel responses of the first antenna and the second antenna, an amplitude ratio of received signals of the first antenna and the second antenna, an amplitude difference between the received signals of the first antenna and the second antenna, a phase difference between the first antenna and the second antenna, and angle-related information of the first antenna and the second antenna, where the first antenna and the second antenna are receive antennas of the terminal.

Optionally, the information about the sensing measurement quantity further includes granularity information of the sensing measurement quantity.

Optionally, the reporting manner of the sensing measurement quantity includes one of the following:

initiating a short data transfer SDT procedure to report the sensing measurement quantity; and initiating random access to report the sensing measurement quantity.

Optionally, the sending manner of the second signal includes one of the following:

sending the second signal in a four-step random access process;

sending the second signal in a two-step random access process;

initiating an SDT procedure to send the second signal; and initiating random access to send the second signal.

Optionally, the sensing indication information is carried in a sensing-associated bit carried in the PEI; or the sensing indication information is carried in a sensing indication bit that is in at least one group of sensing indication bits carried in the PEI and that is associated with a terminal group in which the terminal is located.

Optionally, the radio frequency apparatus 1102 is further configured to:

send configuration signaling to the terminal, where the configuration signaling is used to indicate sensing configuration information.

Optionally, the sensing configuration information includes at least one of the following:

identifier information of at least one type of signal used for sensing measurement, configuration information of at least one type of signal used for sensing measurement, at least one type of information about the sensing measurement quantity, at least one type of resource information for reporting the sensing measurement quantity, and terminal identifier information.

Optionally, the terminal identifier information includes at least one of the following:

a terminal group rule, a terminal group identifier, and a terminal identifier.

Optionally, the first signal includes at least one of the following:

a sensing signal, a reference signal, and a synchronization signal; and/or the second signal includes at least one of the following:

a sensing signal, a reference signal, and a synchronization signal.

Optionally, the reference signal included in the first signal includes at least one of the following:

a channel state information-reference signal CSI-RS, a positioning reference signal PRS, a demodulation reference signal DMRS, a phase tracking reference signal PTRS, and a tracking reference signal TRS; and/or the reference signal included in the second signal includes at least one of the following:

a preamble, an SRS, a DMRS, and a PTRS.

The foregoing network side device can improve sensing performance of the terminal.

An embodiment of this application further provides a readable storage medium. The readable storage medium stores a program or an instruction, and the program or the instruction is executed by a processor to implement the processes of the foregoing sensing measurement method or sensing measurement indication method embodiment, and a same technical effect can be achieved. To avoid repetition, details are not described herein again.

The processor is a processor in the terminal in the foregoing embodiment. The readable storage medium includes a computer readable storage medium, such as a computer read-only memory ROM, a random access memory RAM, a magnetic disk, or an optical disc.

An embodiment of this application further provides a chip. The chip includes a processor and a communication interface, the communication interface is coupled to the processor, and the processor is configured to run a program or an instruction to implement the processes of the foregoing sensing measurement method or sensing measurement indication method embodiment, and a same technical effect can be achieved. To avoid repetition, details are not described herein again.

It should be understood that the chip mentioned in this embodiment of this application may also be referred to as a system-level chip, a system chip, a chip system, or a system on chip.

An embodiment of this application further provides a computer program/program product. The computer program/program product is stored in a storage medium, and the computer program/program product is executed by at least one processor to implement the processes of the foregoing sensing measurement method or sensing measurement indication method embodiment, and a same technical effect can be achieved. To avoid repetition, details are not described herein again.

An embodiment of this application further provides a sensing measurement system, including a terminal and a network side device. The terminal may be configured to perform the steps of the sensing measurement method, and the network side device may be configured to perform the steps of the sensing measurement indication method.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of this application essentially or the part contributing to the prior art may be implemented in a form of a computer software product. The computer software product is stored in a storage medium (for example, a ROM/RAM, a floppy disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are merely illustrative but not restrictive. Under the enlightenment of this application, a person of ordinary skill in the art can make many forms without departing from the purpose of this application and the protection scope of the claims, all of which fall within the protection of this application.

The invention claimed is:

1. A sensing measurement method, comprising:

receiving, by a terminal, a paging early indication (PEI), wherein the PEI comprises sensing indication information; and performing, by the terminal, a target operation according to the sensing indication information, wherein the target operation comprises at least one of the following:

performing sensing measurement on a first signal, and reporting a sensing measurement quantity; or sending, to a target device, a second signal used by the target device to perform sensing measurement, wherein the sensing indication information comprises at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, or terminal identifier information for sending the second signal.

2. The method according to claim 1, wherein the sensing indication information is used to indicate one of the following:

indicating not to detect a paging physical downlink control channel (PDCCH);

indicating to detect a paging PDCCH;

indicating to detect a sensing dedicated PDCCH; or indicating to detect a paging PDCCH and a sensing dedicated PDCCH;

wherein the performing, by the terminal, a target operation according to the sensing indication information comprises at least one of the following:

in a case that the sensing indication information indicates to detect a paging PDCCH, detecting, by the terminal, a paging PDCCH, and performing the target operation according to indication content of the detected paging PDCCH;

in a case that the sensing indication information indicates to detect a sensing dedicated PDCCH, detecting, by the terminal, a sensing dedicated PDCCH, and performing the target operation according to indication content of the detected sensing dedicated PDCCH;

in a case that the sensing indication information indicates to detect a sensing dedicated PDCCH, detecting, by the terminal, a sensing dedicated PDCCH, and demodulating a physical downlink shared channel (PDSCH) according to the detected sensing dedicated PDCCH, and if a terminal identifier in the PDSCH is associated with the terminal, performing the target operation according to indication content of the dedicated PDCCH or the PDSCH;

in a case that the sensing indication information indicates to detect a paging PDCCH and a sensing dedicated PDCCH, detecting, by the terminal, a sensing dedicated PDCCH and a paging PDCCH, and performing the target operation according to indication content of the detected sensing dedicated PDCCH; or in a case that the sensing indication information indicates to detect a paging PDCCH and a sensing dedicated PDCCH, detecting, by the terminal, a sensing dedicated PDCCH and a paging PDCCH, demodulating a PDSCH according to the detected sensing dedicated PDCCH, and if a terminal identifier in the PDSCH is associated with the terminal, performing the target operation according to indication content of the dedicated PDCCH or the PDSCH;

wherein the indication content of the dedicated PDCCH, the indication content of the PDSCH, or the indication content of the paging PDCCH comprises at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, or terminal identifier information for sending the second signal.

3. The method according to claim 1, wherein the indication information of the first signal comprises at least one of the following: identifier information of the first signal, a detection cycle of the first signal, a detection offset of the first signal, or terminal identifier information corresponding to the first signal.

4. The method according to claim 1, wherein the information about the sensing measurement quantity comprises at least one of the following:

a channel matrix, channel state information, a reference signal received power, a received signal strength indicator, a channel power delay spectrum, a Doppler power spectrum, a Doppler spread, a coherence bandwidth, a coherence time, a power of each path in a multipath channel, a delay of each path in the multipath channel, an angle of each path in the multipath channel, a Doppler frequency shift, a quotient of frequency domain channel responses of a first antenna and a second antenna, a conjugate multiplier of the frequency domain channel responses of the first antenna and the second antenna, an amplitude ratio of received signals of the first antenna and the second antenna, an amplitude difference between the received signals of the first antenna and the second antenna, a phase difference between the first antenna and the second antenna, or angle-related information of the first antenna and the second antenna, wherein the first antenna and the second antenna are receive antennas of the terminal;

wherein the information about the sensing measurement quantity further comprises granularity information of the sensing measurement quantity.

5. The method according to claim 1, wherein the reporting manner of the sensing measurement quantity comprises one of the following:

initiating a short data transfer (SDT) procedure to report the sensing measurement quantity;

or initiating random access to report the sensing measurement quantity;

or, wherein the sending manner of the second signal comprises one of the following:

sending the second signal in a four-step random access process;

sending the second signal in a two-step random access process;

initiating an SDT procedure to send the second signal; or initiating random access to send the second signal.

6. The method according to claim 1, wherein the sensing indication information is carried in a sensing-associated bit carried in the PEI; or the sensing indication information is carried in a sensing indication bit that is in at least one group of sensing indication bits carried in the PEI and that is associated with a terminal group in which the terminal is located.

7. The method according to claim 1, wherein the method further comprises:

receiving, by the terminal, configuration signaling, wherein the configuration signaling is used to indicate sensing configuration information; and the performing, by the terminal, a target operation according to the sensing indication information comprises:

performing, by the terminal, the target operation according to the sensing indication information and the sensing configuration information;

wherein the performing, by the terminal, the target operation according to the sensing indication information and the sensing configuration information comprises:

performing, by the terminal, the target operation according to target information, wherein the target information comprises information indicated by the sensing indication information in the sensing configuration information;

wherein the sensing configuration information comprises at least one of the following:

identifier information of at least one type of signal used for sensing measurement, configuration information of at least one type of signal used for sensing measurement, at least one type of information about the sensing measurement quantity, at least one type of resource information for reporting the sensing measurement quantity, or terminal identifier information;

wherein the terminal identifier information comprises at least one of the following:

a terminal group rule, a terminal group identifier, or a terminal identifier.

8. The method according to claim 1, wherein the first signal comprises at least one of the following:

a sensing signal, a reference signal, or a synchronization signal; and/or the second signal comprises at least one of the following:

a sensing signal, a reference signal, or a synchronization signal;

wherein the reference signal comprised in the first signal comprises at least one of the following:

a channel state information-reference signal (CSI-RS), a positioning reference signal (PRS), a demodulation reference signal (DMRS), a phase tracking reference signal (PTRS), or a tracking reference signal (TRS); and/or the reference signal comprised in the second signal comprises at least one of the following:

a preamble, an SRS, a DMRS, or a PTRS.

9. A sensing measurement indication method, comprising:

sending, by a network side device, a paging early indication (PEI) to a terminal, wherein the PEI comprises sensing indication information, the sensing indication information is used by the terminal to perform a target operation, and the target operation comprises at least one of the following:

performing sensing measurement on a first signal, and reporting a sensing measurement quantity; or sending, to a target device, a second signal used by the target device to perform sensing measurement, wherein the sensing indication information comprises at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, or terminal identifier information for sending the second signal.

10. The method according to claim 9, wherein the method further comprises at least one of the following:

sending, by the network side device, the first signal to the terminal;

receiving, by the network side device, the sensing measurement quantity reported by the terminal; or performing, by the network side device, sensing measurement on the second signal sent by the terminal.

11. The method according to claim 9, wherein the sensing indication information is used to indicate one of the following:

indicating not to detect a paging physical downlink control channel (PDCCH);

indicating to detect a paging PDCCH;

indicating to detect a sensing dedicated PDCCH; or indicating to detect a paging PDCCH and a sensing dedicated PDCCH;

wherein in a case that the sensing indication information indicates to detect a paging PDCCH, indication content of the paging PDCCH is used by the terminal to perform the target operation;

in a case that the sensing indication information indicates to detect a sensing dedicated PDCCH, indication content of the sensing dedicated PDCCH is used by the terminal to perform the target operation;

in a case that the sensing indication information indicates to detect a sensing dedicated PDCCH, the sensing dedicated PDCCH is used by the terminal to demodulate a physical downlink shared channel (PDSCH), and if a terminal identifier in the PDSCH is associated with the terminal, indication content of the dedicated PDCCH or the PDSCH is used by the terminal to perform the target operation;

in a case that the sensing indication information indicates to detect a paging PDCCH and a sensing dedicated PDCCH, indication content of the sensing dedicated PDCCH is used by the terminal to perform the target operation; and in a case that the sensing indication information indicates to detect a paging PDCCH and a sensing dedicated PDCCH, the sensing dedicated PDCCH is used by the terminal to demodulate a PDSCH, and if a terminal identifier in the PDSCH is associated with the terminal, indication content of the dedicated PDCCH or the PDSCH is used by the terminal to perform the target operation;

wherein the indication content of the dedicated PDCCH, the indication content of the PDSCH, or the indication content of the paging PDCCH comprises at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, or terminal identifier information for sending the second signal.

12. The method according to claim 11, wherein the indication information of the first signal comprises at least one of the following:

identifier information of the first signal, a detection cycle of the first signal, a detection offset of the first signal, or terminal identifier information corresponding to the first signal;

or, wherein the information about the sensing measurement quantity comprises at least one of the following:

a channel matrix, channel state information, a reference signal received power, a received signal strength indicator, a channel power delay spectrum, a Doppler power spectrum, a Doppler spread, a coherence bandwidth, a coherence time, a power of each path in a multipath channel, a delay of each path in the multipath channel, an angle of each path in the multipath channel, a Doppler frequency shift, a quotient of frequency domain channel responses of a first antenna and a second antenna, a conjugate multiplier of the frequency domain channel responses of the first antenna and the second antenna, an amplitude ratio of received signals of the first antenna and the second antenna, an amplitude difference between the received signals of the first antenna and the second antenna, a phase difference between the first antenna and the second antenna, or angle-related information of the first antenna and the second antenna, wherein the first antenna and the second antenna are receive antennas of the terminal.

13. The method according to claim 11, wherein the reporting manner of the sensing measurement quantity comprises one of the following:

initiating a short data transfer (SDT) procedure to report the sensing measurement quantity; or initiating random access to report the sensing measurement quantity;

or, wherein the sending manner of the second signal comprises one of the following:

sending the second signal in a four-step random access process;

sending the second signal in a two-step random access process;

initiating an SDT procedure to send the second signal; or initiating random access to send the second signal;

or, wherein the sensing indication information is carried in a sensing-associated bit carried in the PEI; or the sensing indication information is carried in a sensing indication bit that is in at least one group of sensing indication bits carried in the PEI and that is associated with a terminal group in which the terminal is located.

14. The method according to claim 11, wherein the method further comprises:

sending, by the network side device, configuration signaling to the terminal, wherein the configuration signaling is used to indicate sensing configuration information;

wherein the sensing configuration information comprises at least one of the following:

identifier information of at least one type of signal used for sensing measurement, configuration information of at least one type of signal used for sensing measurement, at least one type of information about the sensing measurement quantity, at least one type of resource information for reporting the sensing measurement quantity, or terminal identifier information;

wherein the terminal identifier information comprises at least one of the following:

a terminal group rule, a terminal group identifier, or a terminal identifier.

15. The method according to claim 11, wherein the first signal comprises at least one of the following:

a sensing signal, a reference signal, or a synchronization signal; and/or the second signal comprises at least one of the following:

a sensing signal, a reference signal, or a synchronization signal;

wherein the reference signal comprised in the first signal comprises at least one of the following:

a channel state information-reference signal (CSI-RS), a positioning reference signal (PRS), a demodulation reference signal (DMRS), a phase tracking reference signal (PTRS), or a tracking reference signal (TRS); and/or the reference signal comprised in the second signal comprises at least one of the following:

a preamble, an SRS, a DMRS, or a PTRS.

16. A network side device, comprising a processor implemented in hardware and a memory, wherein the memory stores a program or an instruction that can be run on the processor, and the program or the instruction is executed by the processor to implement the steps of the sensing measurement indication method according to claim 9.

17. A terminal, comprising a processor implemented in hardware and a memory, wherein the memory stores a program or an instruction that can be run on the processor, wherein the program or the instruction, when executed by the processor, causes the terminal to perform:

receiving a paging early indication (PEI), wherein the PEI comprises sensing indication information; and performing a target operation according to the sensing indication information, wherein when performing the target operation, the program or the instruction, when executed by the processor, causes the terminal to perform at least one of the following:

performing sensing measurement on a first signal, and reporting a sensing measurement quantity; or sending, to a target device, a second signal used by the target device to perform sensing measurement, wherein the sensing indication information comprises at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, or terminal identifier information for sending the second signal.

18. The terminal according to claim 17, wherein the sensing indication information is used to indicate one of the following:

indicating not to detect a paging physical downlink control channel (PDCCH);

indicating to detect a paging PDCCH;

indicating to detect a sensing dedicated PDCCH; or indicating to detect a paging PDCCH and a sensing dedicated PDCCH;

wherein when performing a target operation according to the sensing indication information, the program or the instruction, when executed by the processor, causes the terminal to perform at least one of the following:

in a case that the sensing indication information indicates to detect a paging PDCCH, detecting a paging PDCCH, and performing the target operation according to indication content of the detected paging PDCCH;

in a case that the sensing indication information indicates to detect a sensing dedicated PDCCH, detecting a sensing dedicated PDCCH, and performing the target operation according to indication content of the detected sensing dedicated PDCCH;

in a case that the sensing indication information indicates to detect a sensing dedicated PDCCH, detecting a sensing dedicated PDCCH, and demodulating a physical downlink shared channel (PDSCH) according to the detected sensing dedicated PDCCH, and if a terminal identifier in the PDSCH is associated with the terminal, performing the target operation according to indication content of the dedicated PDCCH or the PDSCH;

in a case that the sensing indication information indicates to detect a paging PDCCH and a sensing dedicated PDCCH, detecting a sensing dedicated PDCCH and a paging PDCCH, and performing the target operation according to indication content of the detected sensing dedicated PDCCH; or in a case that the sensing indication information indicates to detect a paging PDCCH and a sensing dedicated PDCCH, detecting a sensing dedicated PDCCH and a paging PDCCH, demodulating a PDSCH according to the detected sensing dedicated PDCCH, and if a terminal identifier in the PDSCH is associated with the terminal, performing the target operation according to indication content of the dedicated PDCCH or the PDSCH;

wherein the indication content of the dedicated PDCCH, the indication content of the PDSCH, or the indication content of the paging PDCCH comprises at least one of the following:

indication information of the first signal, information about the sensing measurement quantity, resource information for reporting the sensing measurement quantity, terminal group information, a reporting manner of the sensing measurement quantity, resource information for sending the second signal, indication information of the second signal, a sending manner of the second signal, or terminal identifier information for sending the second signal.

* * * * *